United States Patent
Zhang et al.

(10) Patent No.: US 9,669,464 B1
(45) Date of Patent: Jun. 6, 2017

(54) METHODS OF DEOXYGENATING METALS HAVING OXYGEN DISSOLVED THEREIN IN A SOLID SOLUTION

(71) Applicant: University of Utah Research Foundation, Salt Lake City, UT (US)

(72) Inventors: Ying Zhang, Salt Lake City, UT (US); Zhigang Zak Fang, Salt Lake City, UT (US); Pei Sun, Salt Lake City, UT (US); Yang Xia, Salt Lake City, UT (US); Chengshang Zhou, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 15/216,549

(22) Filed: Jul. 21, 2016

Related U.S. Application Data

(60) Provisional application No. 62/293,667, filed on Feb. 10, 2016.

(51) Int. Cl.
| | | |
|---|---|---|
| *B22F 9/22* | (2006.01) | |
| *B22F 1/00* | (2006.01) | |
| *C22F 1/18* | (2006.01) | |
| *C22C 14/00* | (2006.01) | |

(52) U.S. Cl.
CPC ............ *B22F 9/22* (2013.01); *B22F 1/0048* (2013.01); *B22F 1/0085* (2013.01); *C22F 1/183* (2013.01); *C22C 14/00* (2013.01)

(58) Field of Classification Search
CPC ...................................................... C22F 1/183
See application file for complete search history.

(56) References Cited

U.S. PATENT DOCUMENTS

| | | | |
|---|---|---|---|
| 2,205,854 | A | 6/1940 | Kroll |
| 2,427,338 | A | 9/1947 | Alexander |
| 2,773,787 | A | 12/1956 | Rick |

(Continued)

FOREIGN PATENT DOCUMENTS

| | | |
|---|---|---|
| GB | 800689 | 8/1958 |
| GB | 807889 | 1/1959 |

(Continued)

OTHER PUBLICATIONS

Nersisyan, H. et al. "Direct magnesiothermic reduction of tianium dioxide to titanium powder through combustion synthesis." Chemical Engineering Journal. (2014). 235. p. 67-74.*

(Continued)

*Primary Examiner* — Jessee R. Roe
*Assistant Examiner* — Nicholas Wang
(74) *Attorney, Agent, or Firm* — Thorpe North & Western, LLP

(57) ABSTRACT

A method of deoxygenating metal can include forming a mixture of: a metal having oxygen dissolved therein in a solid solution, at least one of metallic magnesium and magnesium hydride, and a magnesium-containing salt. The mixture can be heated at a deoxygenation temperature for a period of time under a hydrogen-containing atmosphere to form a deoxygenated metal. The deoxygenated metal can then be cooled. The deoxygenated metal can optionally be subjected to leaching to remove by-products, followed by washing and drying to produce a final deoxygenated metal.

25 Claims, 16 Drawing Sheets

(56) References Cited

U.S. PATENT DOCUMENTS

| | | | |
|---|---|---|---|
| 2,804,375 A | 8/1957 | Kamlet | |
| 2,850,379 A | 9/1958 | Hawkes | |
| 2,984,560 A | 5/1961 | Dombrowski | |
| 3,140,170 A * | 7/1964 | Henrie | C22B 34/1268 75/419 |
| 3,472,648 A | 10/1969 | Suriani | |
| 3,721,549 A | 3/1973 | Gallay et al. | |
| 3,903,239 A | 9/1975 | Berkovich | |
| 4,923,531 A | 5/1990 | Fisher | |
| 5,460,642 A | 10/1995 | Leland | |
| 5,503,655 A | 4/1996 | Joseph | |
| 5,779,761 A | 7/1998 | Armstrong et al. | |
| 5,830,420 A | 11/1998 | Borowiec et al. | |
| 6,152,982 A | 11/2000 | Froes et al. | |
| 6,231,636 B1 | 5/2001 | Froes et al. | |
| 6,264,719 B1 | 7/2001 | Zhang et al. | |
| 7,585,457 B2 | 9/2009 | Zhang et al. | |
| 8,007,562 B2 | 8/2011 | Kasparov et al. | |
| 8,092,570 B2 | 1/2012 | Boulos et al. | |
| 8,328,899 B2 | 12/2012 | Adam et al. | |
| 8,388,727 B2 | 3/2013 | Klevtsov et al. | |
| 8,845,998 B2 | 9/2014 | Ishikawa | |
| 8,871,303 B2 | 10/2014 | Han et al. | |
| 9,067,264 B2 | 6/2015 | Moxson et al. | |
| 2004/0103751 A1 | 6/2004 | Joseph et al. | |
| 2006/0236811 A1 | 10/2006 | Withers et al. | |
| 2007/0110655 A1* | 5/2007 | Xie | B01J 2/04 423/263 |
| 2011/0171116 A1 | 7/2011 | Klevtsov et al. | |
| 2012/0070578 A1 | 3/2012 | Han et al. | |
| 2013/0220211 A1* | 8/2013 | Dutta | C30B 1/04 117/7 |
| 2013/0315773 A1 | 11/2013 | Moxson et al. | |

FOREIGN PATENT DOCUMENTS

| | | |
|---|---|---|
| WO | WO 2010/036131 | 4/2010 |
| WO | WO 2015/050637 | 4/2015 |

OTHER PUBLICATIONS

Astrelin et al, "Interaction of TiHx (x>2) with solutions of some acids and alkalies." Hydrogen Materials Science and Chemistry of Metal Hydrides. 2002;82:133-40.

Barksdale, "Titanium: its occurrence, chemistry, and technology." 2nd ed. New York: Ronald Press Co.; 1966.

Bolivar et al, "Recycling, Synthesis of titanium via magnesiothermic reduction of TiO2 (Pigment)", Proceedings of EMC (2009) 1-17.

Chen et al, "Direct Electrochemical Reduction of Titanium Dioxide to Titanium in Molten Calcium Chloride." Nature. 2000;407:361-4.

Crowley, "A new process for titanium extraction and production promises to cut costs and expand applications", Advanced materials & processes (2003) 25-27.

Fang et al, "A new, energy-efficient chemical pathway for extracting Ti Metal from Ti minerals", JACS 135 (2013) 18248-18251.

Froes, "The production of low-cost titanium powders." JOM. 1998;50(September):41-3.

Froes, "Titanium powder metallurgy: a review—Part 1: titanium and its alloys are the materials of choice for many applications, but high cost often negates their use. Powder metallurgy offers a cost-effective fabrication approach", Advanced Materials & Processes 170.9, Sep. 2012, 6 pages, vol. 16, No. 7.

Gueguin, "Chemistry and mineralogy of titanium-rich slags. Part I-Hemo-ilmenite, sulphate, and upgtaded titania slags", Mineral Processing & Extractive Metall. Rev. 28 (2007) 1-58.

Hartman et al, "Producing lower-cost titanium for automotive applications", JOM 50 (1998) 16-19.

Hunter, "Metallic titanium", JACS 32 (1910) 330-336.

Kikuchi et al, "Rapid reduction of titanium dioxide nano-particles by reduction with a calcium reductant", J. Phys. Chem. Solids 75 (2014) 1041-1048.

Kroll, "The production of ductile titanium." Trans Met Soc AIME. 1959;215:546-53.

Lasheen, "Soda ash roasting of titania slag product from Rosetta ilmenite." Hydrometallurgy. 2008;93(3-4):124-8.

Lin, "The effect of alkali salt catalyst on the carbothermic reduction of nickel oxide." Metallurgical Transactions B. 1987;19B:685-6.

Middlemas et al, "A new method for production of titanium dioxide pigment", Hydrometallurgy 131 (2013) 107-113.

Middlemas, "Energy-conscious production of titania and titanium powders from slag", University of Utah, (2014).

Nersisyan et al, "Direct magnesiothermic reduction of titanium dioxide to titanium powder through combustion synthesis", Chem. Eng. J. 235 (2014) 67-74.

Oh et al, "Deoxidation of Ti powder and preparation of Ti ingot with low oxygen concentration", Mater. Trans. 53 (2012) 1075-1077.

Oh et al, "Preparation of low oxygen content alloy powder from Ti binary alloy scrap by hydrogenation-dehydrogenation and deoxidation process", J. Alloys Compd. 593 (2014) 61-66.

Okabe et al, "Titanium powder production by preform reduction process (PRP)", J. Alloys Compd. 364 (2004) 156-163.

Rao et al, "Catalysis by alkali carbonates of carbothermic reduction of magnetite concentrates." Ironmaking and Steelmaking. 1984;11(6):308-18.

Suzuki et al, "Calcium-deoxidation of niobium and titanium in Ca-saturated $CaCl_2$ molten salt", J. Alloys Compd. 288 (1999) 173-182.

Technologies E. Summary of Emerging Titanium Cost Reduction Technologies. Vancouver, WA2004. p. 12.

Vuuren et al, "Opportunities in the Electrowinning of Molten Titanium from Titanium Dioxide", JOM, Oct. 2005, 3 pages.

Won et al, "Titanium powder prepared by a rapid exothermic reaction", Chem. Eng. J. 157 (2010) 270-275.

Xu et al, "Behavior of calcium chloride in reduction process of titanium dioxide by calcium vapor", J. Alloys Compd. 576 (2013) 208-214.

Xue, "Production of Titanium Dioxide by Decomposition of Titanium Slag with Molten Sodium Hydroxide", Dalian University of Technology, (2009).

Zhang et al, "A literature review of titanium metallurgical processes", Hydrometallurgy 108 (2011) 177-188.

Zhang et al, "A novel preparation of titanium dioxide from titanium slag." Hydrometallurgy. 2009;96(1-2):52-6.

Zheng et al, "Production of titanium powder by the calciothermic reduction of titanium concentrates or ore using the preform reduction process", Mater. Trans. 48 (2007) 2244-2251.

* cited by examiner

METHODS OF DEOXYGENATING METALS HAVING OXYGEN DISSOLVED THEREIN IN A SOLID SOLUTION

RELATED APPLICATION

This application claims priority to U.S. Provisional Patent Application No. 62/293,667, filed Feb. 10, 2016.

GOVERNMENT INTEREST

This invention was made with government support under Award DE-AR0000420 awarded by the Department of Energy. The government has certain rights in the invention.

BACKGROUND

Titanium (Ti) and Ti alloys (all referred to as Ti hereafter) have many applications in aerospace, biomedical, chemical, architecture, and consumer industries. Using Ti powder as a starting material for sintering is one approach for manufacturing products from Ti. Ti powder has been in especially high demand in recent years due to the advent of additive manufacturing technologies. Ti is a promising material for additive manufacturing of metals. However, the current market size of Ti powder is very small. At least one reason for the small market is the fact that Ti powder is often very expensive.

There are a number of factors that contribute to the high cost of making Ti powder. One of these factors is that Ti powder must meet stringent requirements for low oxygen content. Oxygen in Ti metal or alloys can be detrimental to mechanical properties of the Ti metal or alloys. Higher than acceptable oxygen content in Ti can lead to low ductility, poor formability, brittleness, and potential for premature failures.

However, controlling and minimizing oxygen content in Ti is not a trivial task. Ti has strong chemical affinity to oxygen. Ti metal is easily oxidized under normal conditions. In fact, there are only a handful of elements that has stronger affinity to oxygen than Ti. Those elements include Ca, Mg, Be, Li, Ba, Al and U. In theory, these elements can be used to reduce titanium oxide, $TiO_2$.

One challenge for making high purity and low oxygen Ti powder is to control and minimize the oxygen content in Ti powder. Methods for controlling oxygen content in Ti powder can be different depending on the specific conditions and methods used to produce and handle the powder. In some situations, when Ti powder is produced, the oxygen content in the powder may not meet the specifications, i.e., the oxygen content is higher than desired. Thus, Ti powder with higher than desired oxygen content is often subjected to a "deoxygenation" treatment. The purpose of deoxygenation is to remove oxygen from the material and reduce the oxygen content to an acceptable level. Typical requirements for oxygen content in Ti alloys in final product form can be less than 0.2%. In order to meet such a requirement, if the powder is to be used as the raw material to fabricate the product, the oxygen content in the initial powder can be less than 0.15% or 0.12% in consideration that oxygen content will most often increase during the fabrication processes.

Ti primary metal is typically produced commercially using either the industry standard batch-operated Kroll process or the Hunter processes. The Kroll process is the most dominant process today globally due to both technical as well as economic considerations. In the Kroll process, titanium tetrachloride ($TiCl_4$) is reduced by liquid Mg to produce Ti sponge. Undesired impurities can be removed relatively easily from $TiCl_4$ by distillation, and purified $TiCl_4$ enables the production of highly purified Ti metal. However, the processes to produce $TiCl_4$ involve a series of highly energy intensive and costly processes, which leads to a high price for $TiCl_4$. Furthermore, $TiCl_4$ is highly hazardous such that even a minor leak can cause serious damage to most metal structures and electrical equipment in the vicinity.

To avoid the drawbacks of using $TiCl_4$, one alternative is to use commercial $TiO_2$ as the precursor, which is safe to work with and can alternatively be produced via a sulfate process instead of the chloride process by oxidation of $TiCl_4$. Direct use of electricity to reduce $TiO_2$ is one option for making Ti powder from $TiO_2$. However, the difficulties of scaling up electrolytic cells and contaminating from carbon are drawbacks to this option. Other challenges also exist in reducing $TiO_2$. First, it is more difficult to meet the requirements for oxygen content in a final product made from $TiO_2$ than to reduce the chlorine content of Ti made from $TiCl_4$, due to the strong affinity of oxygen to titanium. Second, the oxide byproducts involved have much higher melting points than the chlorides produced by reducing $TiCl_4$. Therefore, the oxide byproducts are separated from titanium by acid leaching instead of distillation. These issues continue to prevent the widespread use of $TiO_2$ as a precursor for manufacturing Ti powder.

Titanium is known to dissolve interstitially about 33 atomic percent of oxygen. The solid solution Ti(O) includes titanium metal with dissolved oxygen atoms, which is different from titanium oxide $TiO_2$. The process of making Ti from $TiO_2$ can be divided into two substeps: "reduction" of reducing $TiO_2$ to form Ti(O) through various $Ti_xO_y$ intermediates. The oxygen content of the Ti(O) can be as high as about 14% by weight with oxygen atoms occupying octahedral interstitial sites within the Ti crystal lattice. The second substep of "deoxygenation" involves further reducing dissolved oxygen content in Ti(O) to the desired final oxygen content. Two considerations affect the cost of this process for Ti metal production: (1) most of the oxygen in $TiO_2$ will be removed during the reduction of $TiO_2$ to Ti(O), thus the amount of reducing agent and any other input chemicals (such as salt) will be large, and the cost of recycle or reclaiming these chemicals can be substantial; (2) the Ti—O binding energy in Ti(O) is stronger than that in rutile, and even stronger than in MgO when the oxygen content is less than 1.5% by weight. This limits the type of deoxygenation reagent that can effectively reduce the oxygen content of Ti(O). It has been reported that Ca is the only economical agent for deoxygenation.

When Ca metal is adopted, the reduction and deoxygenation steps can be merged into one step, which is named calciothermic reduction. Four different forms of Ca can be used as options for calciothermic reduction, including solid hydride $CaH_2$, vapor-Ca, liquid-Ca, and electronically mediated reduction (EMR). The oxygen content in Ti or Ti alloys can be minimized to a very low level using Ca, for instance, 0.42% of oxygen by weight was reported in Ti metal with the assistance of $CaCl_2$ at 900° C. by reducing $TiO_2$. A wide range of other Ti alloys can also be prepared by calcium co-reduction of their oxide mixtures.

In addition, Ca can be applied in an independent deoxygenation process, such as the DOSS process developed by RMI Titanium. This process can include using liquid Ca as the deoxidant. This technology has been used to reduce oxygen content in β Ti alloys (for instance, Ti—Mo and Ti—V alloys). Using Ca vapor generated in vacuum as the deoxygenation agent at a relatively low temperature of 500-830° C. has also been investigated. In another method, titanium scrap with high initial oxygen content is deoxidized by mixing with Ca and $CaCl_2$ and heating to 900-950° C. in argon, during which the $CaCl_2$ is used to dissolve the byproduct of CaO to accelerate the oxygen removal rate. In order to avoid the impurity contamination from Ca metal, deoxygenation of Ti can also be conducted by dissolving Ca vapor in $CaCl_2$ salt and using the chemically active Ca-saturated salt as the reducer at 1000° C.

Credited to the strong reducing ability of Ca, the various modes of calciothermic reduction and deoxygenation have been developed. However, the high operating temperature of around 900-1000° C. is a disadvantage, due to the high melting points of Ca and $CaCl_2$.

Compared to Ca, it is traditionally believed that Mg metal can be used for preliminary reduction of $TiO_2$ and Ca for the final deoxygenation if economics dictates such a preference, because Mg is reported to be not a strong enough reducing agent to reduce the oxygen level to the required threshold for Ti sponge, which is thought to be only effective at reducing titanium to a minimum oxygen content of 3.58% by weight at temperatures below 900° C., and thermodynamic analysis shows that there is a lower limit to the oxygen content by Mg at approximately 1.9%. Thus, the reported results of reducing $TiO_2$ by Mg have been with an oxygen content of higher than 1% by weight.

SUMMARY

A method of deoxygenating metal can include forming a mixture of: (a) a metal having oxygen dissolved therein in a solid solution, (b) metallic magnesium or magnesium hydride, and (c) a magnesium-containing salt. The mixture can be heated at a deoxygenation temperature for a period of time under a hydrogen-containing atmosphere to form a deoxygenated metal. The deoxygenated metal can then be cooled.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
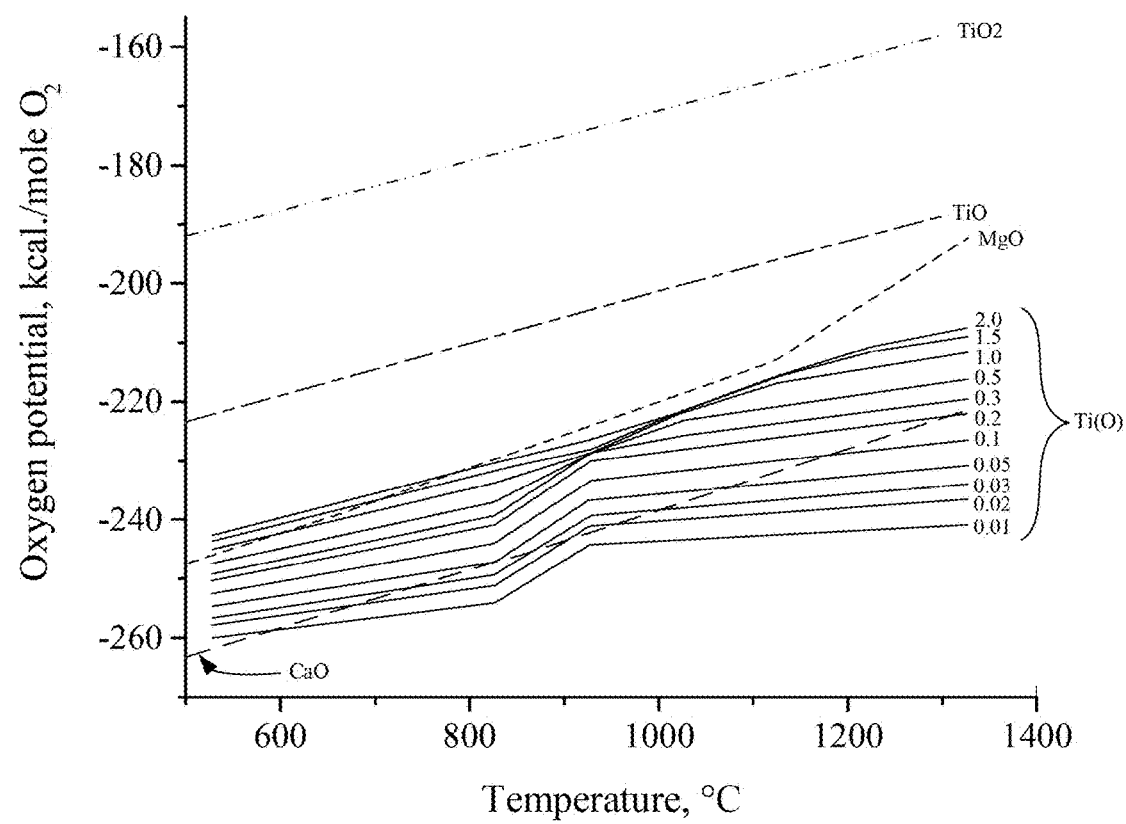
FIG. 1 is a graph of oxygen potential in MgO, CaO, $TiO_2$, TiO and Ti(O)

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

DEFINITIONS

In describing and claiming the present invention, the following terminology will be used.

It is noted that, as used in this specification and in the appended claims, the singular forms "a," "an," and "the" include plural referents unless the context clearly dictates otherwise. Thus, for example, reference to "a metal" includes one or more of such materials, reference to "a period of time" includes reference to one or more of such periods, and reference to "heating" includes reference to one or more of such steps.

As used herein, the term "solid solution" is used to denote a solid-state solution of one or more solutes in a solvent, particularly a solid metal. In a solid solution, the crystal structure of the solvent remains substantially unchanged by the solute atoms. For example, in a solid solution of oxygen in titanium, oxygen atoms are dissolved in titanium metal without substantially changing the crystal structure of the titanium metal. Thus, a solid solution of oxygen in titanium metal is substantially different from a titanium oxide, which has a different structure from titanium metal. As used herein, "Ti(O)" refers to a solid solution of oxygen in titanium, while "TiO" and "TiO$_2$" refer to oxides of titanium. It is also noted that other oxides of titanium exist, such as "Ti$_2$O$_3$," and "Ti$_3$O$_5$."

As used herein, "deoxygenation" refers to the process of removing oxygen from a solid solution. As such, deoxygenation as a mechanism is distinct from reduction. For example, a Ti(O) solid solution can be deoxygenated to remove dissolved oxygen, while a TiO$_2$ oxide can be reduced to convert the oxide to metallic Ti. Thus, reduction involves a change in oxidation state of Ti, while removing dissolved oxygen does not involve a change in oxidation state of Ti.

As used herein, the term "eutectic" is used to describe a mixture of two or more components that has a lower melting point than either component alone. Thus, a "eutectic salt" has a lower melting point than the individual salts making up the eutectic salt mixture. However, as used herein, "eutectic" does not necessarily require that the composition of the mixture is at precisely the "eutectic point," which is a singular composition that produces the minimum possible melting point. Rather, the eutectic salts described herein can have a variety of compositions that produce a melting point lower than the melting points of the individual salts. In certain examples, the eutectic salt can have a composition that is at or near the "eutectic point," which has a minimum melting point.

As used herein, the terms "about" and "approximately" are used to provide flexibility, such as to indicate, for example, that a given value in a numerical range endpoint may be "a little above" or "a little below" the endpoint. The degree of flexibility for a particular variable can be readily determined by one skilled in the art based on the context.

As used herein, the term "substantially" refers to the complete or nearly complete extent or degree of an action, characteristic, property, state, structure, item, or result. The exact allowable degree of deviation from absolute completeness may in some cases depend on the specific context. However, the nearness of completion will generally be so as to have the same overall result as if absolute and total completion were obtained. The use of "substantially" is equally applicable when used in a negative connotation to refer to the complete or near complete lack of an action, characteristic, property, state, structure, item, or result.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein.

Accordingly, the scope of the invention should be determined solely by the appended claims and their legal equivalents, rather than by the descriptions and examples given herein.

Examples of the Technology

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing the system, or the related devices or methods, individual or separate descriptions are considered applicable to one other, whether or not explicitly discussed in the context of a particular example or embodiment. For example, in discussing a device per se, other device, system, and/or method embodiments are also included in such discussions, and vice versa.

Furthermore, various modifications and combinations can be derived from the present disclosure and illustrations, and as such, the following figures should not be considered limiting.

Because Ti has a significant solubility for oxygen, the thermodynamic driving force of removing oxygen in Ti solid solution with oxygen is different from that of the reduction of its oxide. FIG. 1 shows the oxygen potential in Ti(O) versus that in CaO and MgO, indicating the potential reducing agents of Mg and Ca. In the figure, the oxygen potential of TiO$_2$, TiO, MgO, and CaO are shown as dashed lines. The oxygen potentials of several Ti(O) solid solutions are shown as solid lines. The weight percent of oxygen dissolved in each Ti(O) solid solution is designated by the number next to each line (i.e. 0.01 to 2.0%). Changes in slope of the Ti(O) lines correspond to a phase transition from α-Ti(O) or β-Ti(O) phases. This figure shows that Ca can be a strong deoxygenation agent. For example, Ca can be capable of reducing oxygen content to below 0.2% in either α-Ti(O) or β-Ti(O) phases at low or high temperatures respectively (i.e., any temperature below about 1300° C.), while it is practically impossible to do so using Mg.

The theoretical analysis of deoxygenating ability for Ca and Mg is based on the oxygen potential in the metal oxides, including MgO, CaO, and $TiO_x$ (Ti—O solid solutions with various oxygen contents), which are shown in FIG. 1. In principle, as the temperature is raised, the oxygen potential in CaO increases more rapidly than that in $TiO_x$. This continues throughout the α-solution range with Ca becoming a poorer reducing agent as the temperature increases. When the temperature is raised through the α-β transformation region, the Ti—O solutions decrease rapidly in stability, the Ca again becomes a more effective reducing agent. At higher temperatures, Ca becomes less effective again. Deoxygenation is less effective at higher temperatures for both α and β Ti—O solid solutions. This is the same case for Mg. However, based on this figure Mg appears to be too poor a deoxygenation agent for possible deoxygenation of $TiO_x$. The indicated equilibrium oxygen concentration obtainable by Mg deoxygenation is about 1% by weight at 610° C. At higher temperatures, the extent of deoxygenation will be less. Hence, it is not surprising that Mg has not been used as a deoxygenation agent, even though Mg metal can be cheaper and safer to handle than Ca.

Previously, Ti has been deoxygenated by using calcium (Ca) as a deoxygenation agent. In one such process, solid Ca is mixed with Ti powder and heated to above 900° C. Oxygen in the Ti is reacted with molten Ca to yield CaO and Ti with low oxygen content. Ti is in a solid state during this deoxygenation process. However, in order to be effective, the temperature used is high enough to melt the Ca. High temperature operations can have many disadvantages including: high temperature causes powder to sinter-bond, which has to be milled to separate particles; high temperature is demanding on reactors and other equipment issues; high temperature may cause contamination of powder; and high energy consumption. Additionally, the material cost for removing equal moles of oxygen by using Ca is at least two times that required when using Mg. Furthermore, Ca is very active and can be difficult to handle.

The present disclosure describes a process for deoxygenation of Ti or other metals using Mg. In some embodiments, the metal can have a dissolved oxygen content from about 0.15 wt % to about 14.3 wt %. The oxygen can be dissolved in the metal in a solid solution, such as the Ti(O) solid solutions described above. Accordingly, in some cases the metal can be devoid or substantially devoid of oxides. However, eliminating oxides from the metal beforehand may in some cases be difficult. Accordingly, in some embodiments the metal can include less than 50% by weight of metal oxides, or in other embodiments less than 10% by weight of metal oxides. In another aspect, the metal can include less than 40 wt % of metal oxides. In a more specific embodiment, the metal can include less than 20 wt % of metal oxides.

Although much of the description herein focuses on titanium metal, the deoxygenation methods described herein can also be used with other metals. In particular, metals that have a high reactivity with oxygen can benefit from the present methods. In some embodiments, the metal can include titanium, aluminum, vanadium, iron, nickel, cobalt, copper, niobium, tantalum, zirconium, tungsten, molybdenum, hafnium, hydrides thereof, or alloys thereof. In a particular example, the metal can include titanium. In another optional aspect, the process mixture and metal can be substantially devoid of ceramics, or other composite materials. Similarly, in some cases the metal can consist essentially of at least one of the reduced metal, oxygen in solution with the metal, oxides of the metal, and hydrides of the metal.

The metal can be obtained commercially or produced by reduction of corresponding metal oxides. For example, a Ti metal can be formed by reducing a purified $TiO_2$ to form a hydrogenated titanium product and dehydrogenating the hydrogenated titanium product to form the metal. A specific exemplary such process is described in U.S. application Ser. No. 14/935,245, filed Nov. 6, 2015, entitled "Methods of Producing a Titanium Product," which is incorporated herein by reference.

Although the metal can be a solid or relatively large pieces, in many cases the metal can be a particulate metal. The particulate metal can have any suitable particle size. However, as a general guideline particle sizes can range from 0.1 μm to 10 mm, and in some cases 1 μm to 500 μm, and in other cases from about 5 μm to 45 μm.

In one case, the metal can be a substantially spherical Ti or Ti alloy powder. Particularly suitable spherical Ti or Ti alloy powder can be formed using a process described in U.S. application Ser. No. 14/950,346, filed Nov. 24, 2015, entitled "Production of Substantially Spherical Metal Powders," which is incorporated herein by reference. In this process, a Ti or Ti alloy powder can be milled and mixed with a binder in a solvent to form a slurry. The slurry can then be granulated to form substantially spherical granules. Each granule can be an agglomeration of multiple particles of the powder held together by the binder. The granules can then be debinded by heating, and then the debinded granules can be partially or fully sintered so that the individual particles making up the granules fuse together. The final result can be a substantially spherical Ti or Ti alloy powder.

In yet another aspect, the metal can be a spherical Ti or Ti alloy powder formed from a hydrogenated titanium product.

In a further example, the metal can be a substantially spherical Ti or Ti alloy powder formed using a plasma torch spheroidizing system. Exemplary plasma torch spheroidization systems include the TekSphero™ induction plasma torch systems available from Tekna Plasma Systems Inc. These systems can convert irregularly shaped metal particles to substantially spherical metal particles by passing the particles through an induction plasma torch. The particles melt as they pass through the plasma torch and then cool to form spherical particles. Using this type of system to make spherical Ti or Ti alloy powder has been very difficult because the irregularly shaped Ti powder starting materials available tend to have higher than desired oxygen content, especially with respect to relatively finer powders due to a relatively high surface area to weight ratio. However, the deoxygenation methods disclosed herein can be used to deoxygenate spherical Ti or Ti alloy powder that has been spheroidized using a plasma torch system. In some examples, a substantially spherical Ti or Ti alloy powder can be formed using an induction plasma torch, and then the resulting powder can be deoxygenated using the methods described herein. In other examples, the deoxygenation methods described herein can be used to deoxygenate an irregularly shaped Ti or Ti alloy powder, and then subsequently the deoxygenated powder can be spheroidized using an induction plasma torch. In yet another aspect, non-spherical titanium hydride particles can be spheroidized directly.

The present technology provides for the use of Mg to deoxygenate metals. Mg is, generally speaking, not as strong a deoxygenation agent as Ca for Ti(O) solid solutions. Based on the fundamentals of thermodynamics, there is a limit of oxygen content in Ti to which Mg can reduce Ti(O). It is widely recognized that the limit of oxygen content in Ti(O) to which it can be reduced using Mg at 750° C. is 1.5% to 2% by weight, which is significantly higher than suitable for many applications of Ti powder. Also, this limit is affected by the temperature. Usually, at very low temperatures, Mg is thermodynamically capable of minimizing oxygen content in Ti, as shown in FIG. 1. However, the kinetic rate of reaction at those very low temperatures would be very slow, making it practically impossible to produce deoxygenated Ti in this way. More specifically, an equilibrium temperature can be defined as the temperature at which the oxygen potential in Ti(O) equals that in MgO. At temperatures below the equilibrium temperature, Mg is thermodynamically capable of deoxygenating Ti(O), while at temperatures above the equilibrium temperature, Mg cannot deoxygenate Ti(O). However, the challenge is that the kinetic rates of any reaction between Mg and Ti(O) would be very limited, even practically impossible, at low temperatures.

Figure 2:
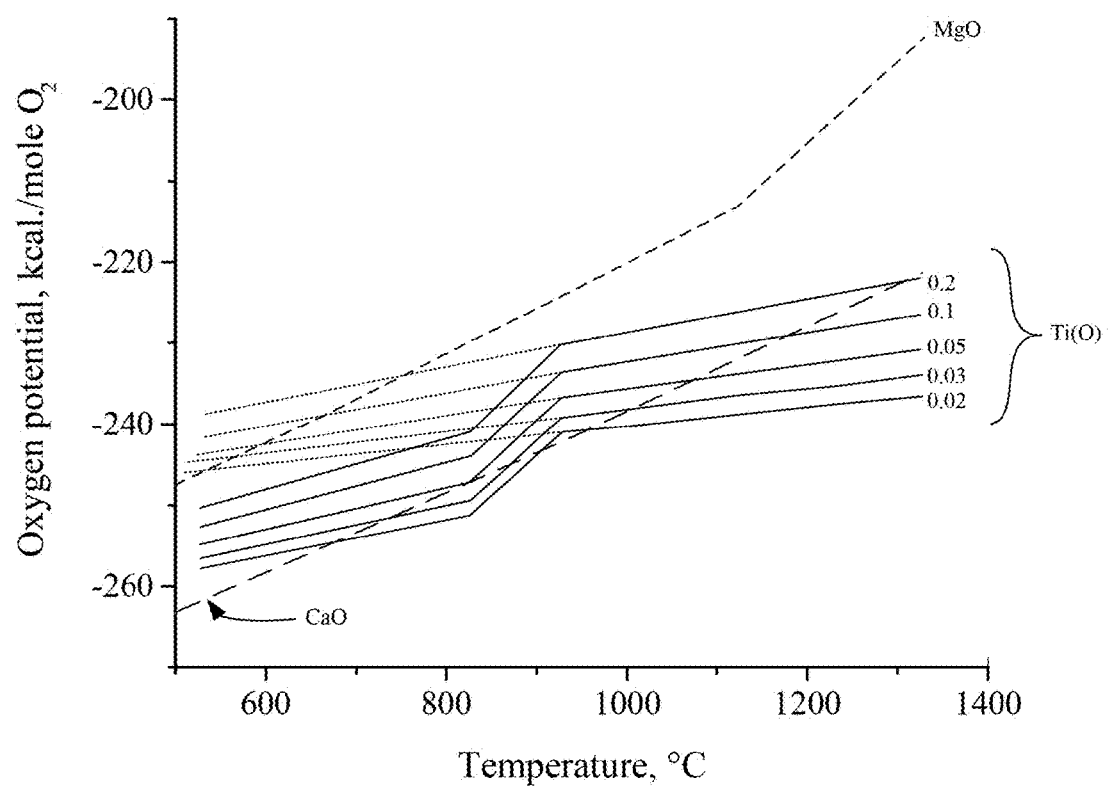
FIG. 2 is a graph of oxygen potential in MgO, CaO and Ti(O) with H dissolved in the Ti(O)

However, the present technology can allow Ti(O) to be deoxygenated by Mg at moderately high temperatures when the process is carried out in a hydrogen ($H_2$) containing atmosphere. In some embodiments, the hydrogen-containing atmosphere can be substantially pure hydrogen. In alternative embodiments, the hydrogen-containing atmosphere can be a mixture of hydrogen and argon (Ar). Hydrogen acts as a β phase stabilizer for Ti. When Ti contains dissolved hydrogen, the transition temperature between α and β phase decreases. FIG. 2 shows oxygen potentials for several Ti(O) solid solutions having different amounts of dissolved oxygen. The solid black lines indicate the oxygen potentials of the Ti(O) solid solutions. As in FIG. 1, the slope of the solid lines changes in the transition region between α and β phases. FIG. 2 also shows dotted lines extending from the solid lines. The dotted lines represent the oxygen potential of the Ti(O) solid solutions when dissolved hydrogen is also present. The dissolved hydrogen lowers the α to β phase transition temperature so that the dotted lines continue from the solid lines without changing slope. Because the oxygen potential of the Ti(O) solutions is changed in this region, the relative stability of MgO versus Ti(O) is changed. For example, at approximately 750° C., Ti-(0.2% O) is more stable than MgO when it is in alpha phase (without hydrogen), while MgO is more stable than Ti(O) when it is in beta phase (with hydrogen). Thus, Mg can be used to deoxygenate Ti(O) in the presence of hydrogen. In this case, the equilibrium oxygen concentration in Ti by Mg deoxygenation is about 0.2 wt % at 755° C., 0.1 wt % at 670° C., and 0.05 wt % at 590° C. In other words, by introducing $H_2$ at a relatively low temperature (<900° C.), Mg can deoxygenate Ti(O), while this was not feasible without using hydrogen. The hydrogen induces the phase transformation from α-Ti to β-Ti, changing the thermodynamic relationship between MgO and Ti(O). In the case of α-Ti(O), the temperature would have to be lower than 500° C. to reach 0.3% O in Ti(O).

Therefore, the present invention allows deoxygenation of Ti(O) using Mg in the presence of hydrogen. For Ti with a given oxygen content, e.g. 0.2% O, the temperature at which Mg can reduce its oxygen content increases to a higher temperature in a hydrogen atmosphere than in an inert atmosphere, which can make the deoxygenation kinetically feasible. At a given temperature, the minimum oxygen content in Ti is lower after reaction with Mg in $H_2$ or $Ar+H_2$ atmosphere than in pure Ar atmosphere. By the use of hydrogen, Mg can be used to deoxygenate Ti(O) to a level of oxygen content that meets the specifications of commercial Ti and Ti alloys.

Figure 3:
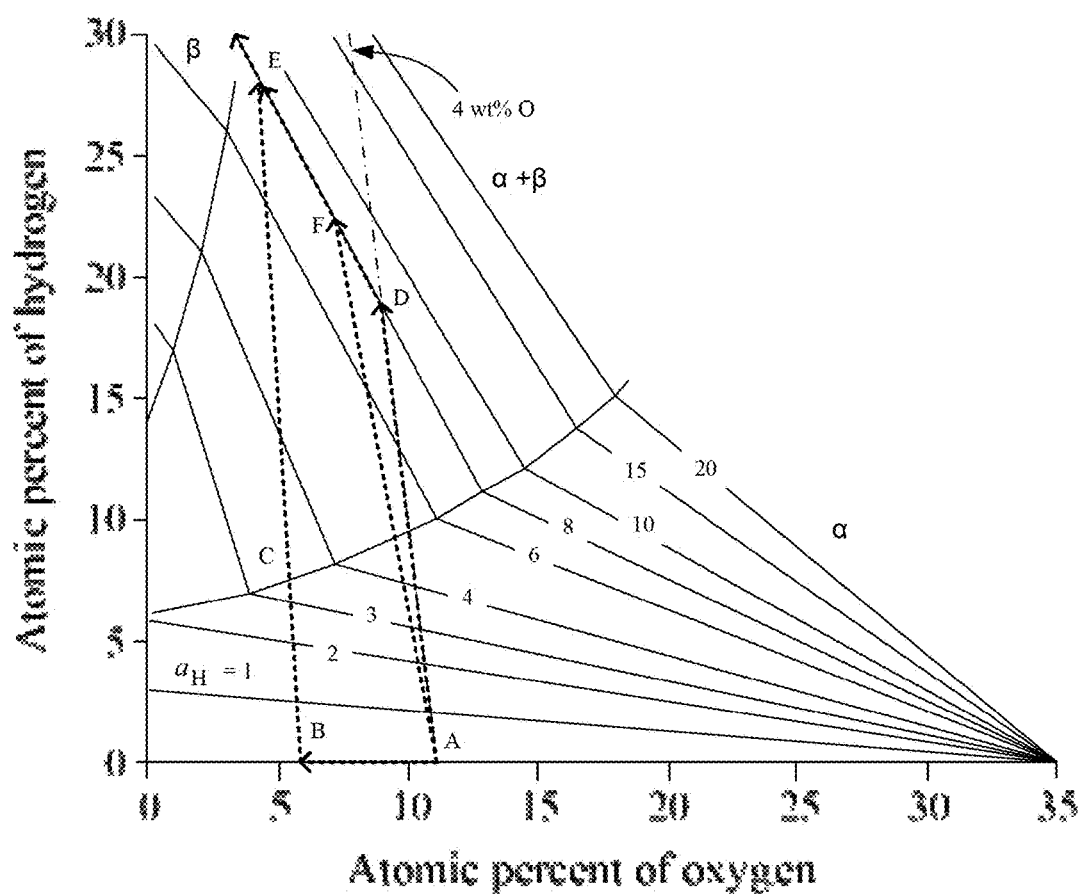
FIG. 3 is a phase diagram of Ti—O—H at 700° C.

FIG. 3 is a phase diagram of Ti—O—H at 700° C. In FIG. 3, $a_H$ is defined by the expression:

$$a_H = \sqrt{P_{H_2}(\text{torr})} \quad (1)$$

For example, at 1 atm $H_2$, $a_H$=27.6; at 0.5 atm $H_2$, $a_H$=19.5; at 0.1 atm $H_2$, $a_H$=8.7; and at 0.05 atm $H_2$, $a_H$=6.16. Thermodynamically, the introduction of $H_2$ can enable deoxygenation by Mg; further, the partial pressure of $H_2$ can affect the phase transformation rate, deoxygenation kinetics and the hydrogen content in the deoxygenated Ti powder, which can be concluded by analyzing the Ti—H—O ternary phase diagram. By taking the phase diagram at 700° C. for example, which is shown in FIG. 3, the following can be deduced.

A Ti(O) solution can have an initial oxygen content of 4% by weight at point A on the phase diagram. If the initial α-Ti is heated in argon at 1 bar with Mg as a deoxygenation agent, the system point will theoretically shift to and equilibrate at point B along the dotted line from A to B. The oxygen content at point B is 2% by weight, which is the thermodynamic limit when using Mg as a deoxygenation agent at these conditions. On the other hand, if the initial α-Ti is heated in a hydrogen containing atmosphere (for instance with $a_H$=8, at a total pressure of 1 atm, or 8.42% $H_2$ by volume) but without the Mg, the system point will shift to and equilibrate at point D along the dotted line from A to D. Thus, the Ti(O) solution absorbs hydrogen and enters the α and β coexistence region. The α phase Ti at point B can reach point E (α-β Ti with more β phase than point D) along the dotted line from B to E by heating in the hydrogen containing atmosphere without Mg. Additionally, α-β Ti at point D can reach point E along of the dotted line from D to E by heating up in the same hydrogen containing atmosphere with the Mg deoxygenation agent.

If the initial α-Ti is heated in the same hydrogen containing atmosphere with the Mg deoxygenation agent in a single step, the oxygen dissolved in α-Ti will be captured gradually by the Mg, and the metal will absorb hydrogen gradually as well. Under these conditions, the system point will shift from A to F along the line from A to F, where the radian of the line A to F is determined by the rate of deoxygenation and hydrogenation, and then can go further along the line from F to E.

If enough Mg is added under the same controlled atmosphere, the initial α-Ti will be deoxygenated and hydrogenated simultaneously, shifting from A to F on the isopiestic line of $a_H$=8. The phase composition of Ti progresses from α-Ti to a mixture of α(more) and β(less) Ti, then to a mixture of α(less) and β(more) Ti, and finally to β-Ti.

Furthermore, it should be noted that the oxygen diffusion rate in β-Ti is faster than in α-Ti, thus the higher the partial pressure of hydrogen, the faster the β-Ti phase emerges, and the more the β-Ti amount near the beginning. Additionally, the oxygen solubility in β-Ti is much lower than that in α-Ti according to the Ti—O phase diagram, which also ensures more favorable deoxygenation in β phase Ti.

After deoxygenating the Ti in this way, the hydrogen can be easily removed through a simple heat treatment in vacuum or inert atmosphere, thereby leaving pure Ti with extremely low levels of oxygen and hydrogen. Besides the thermodynamic advantage contributed by hydrogen, the kinetics of deoxygenation may also be enhanced by taking advantage of the fast diffusion rate of oxygen in β phase.

In some embodiments, an oxygen gradient can form in the Ti particles during the deoxygenation process. The oxygen concentration gradient between the Ti core and the surface will further promote the diffusion of oxygen to the surface to react with the deoxygenation agent until the system reaches its equilibrium.

Figure 4:
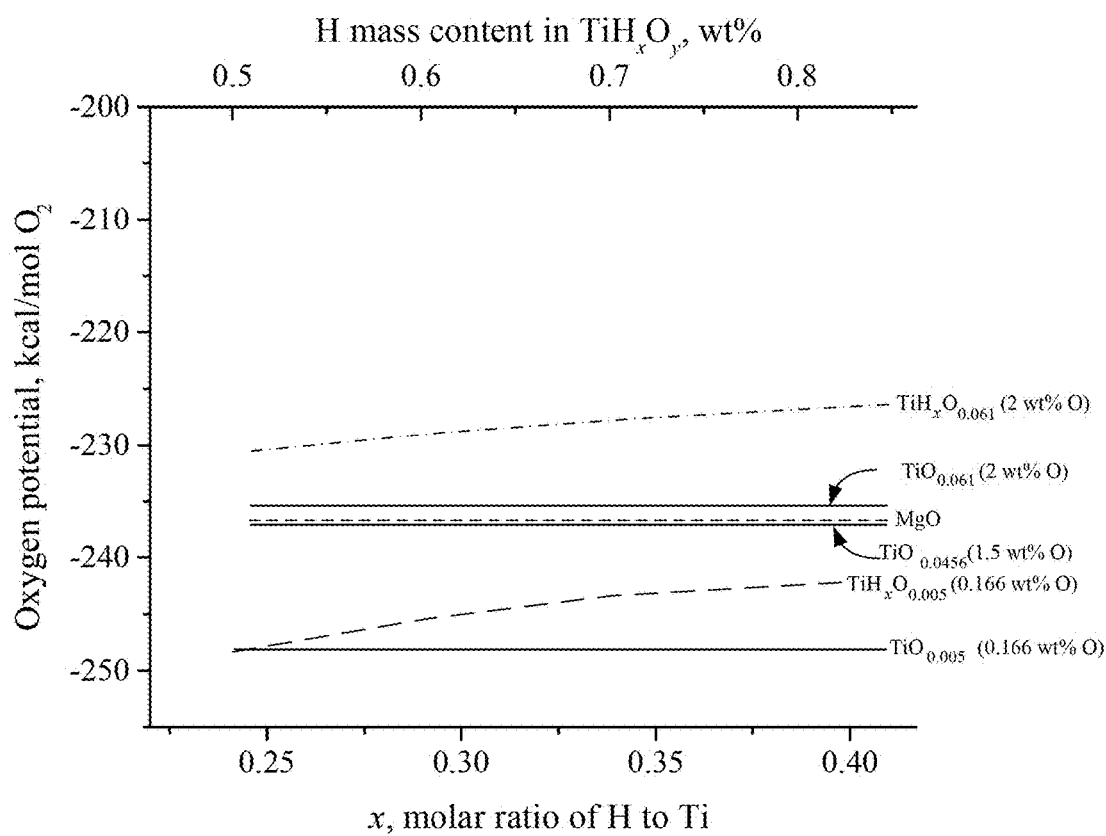
FIG. 4 is a graph of oxygen potential vs. hydrogen content for various Ti—O—H, Ti—O, and MgO compositions at 700° C.

To quantitatively evaluate the deoxygenation capability by Mg in $H_2$, the oxygen potential in $Ti(H)_x(O)_y$ was estimated and plotted in FIG. 4, comparing the oxygen potentials in MgO, $Ti(O)_x$ and $Ti(H)_x(O)_y$ with approximately 2, 1.5, and 0.166 wt % oxygen respectively. At 700° C., without hydrogen, the oxygen potential in MgO equals approximately that in $Ti(O)_{0.0456}$ (1.5 wt % O), while the oxygen potential in $Ti(O)_{0.005}$ (0.166 wt % O) is significantly lower than that in MgO, i.e. $Ti(O)_{0.005}$ is more stable than MgO and Mg cannot remove oxygen from $Ti(O)_{0.005}$.

However, with hydrogen, the oxygen potentials in both $Ti(H)_x(O)_{0.005}$ and $Ti(H)_x(O)_{0.061}$ are less negative than that in $Ti(O)_{0.005}$ and $Ti(O)_{0.061}$, respectively, indicating that hydrogen destabilizes Ti—O solid solutions, thus increasing the driving force for Mg to capture oxygen from the Ti—O solutions. In general, FIG. 4 shows that the oxygen potential is a function of both oxygen and hydrogen content. When oxygen content is low, $Ti(H)_x(O)_y$ may still be more stable than MgO. At a given oxygen content, the oxygen potential increases with the increase of hydrogen. However, it is noted that the data in FIG. 4 is limited to the hydrogen content up to 0.83 wt %, which is low. This limit is due to the availability of data in the published phase diagram. In practice, the hydrogen content can be significantly higher than 1.0 wt %. This is further shown in FIG. 7.

In another embodiment, the deoxygenation of Ti(O) with Mg in a hydrogen containing atmosphere can be carried out in the presence of a molten salt. The deoxygenation temperature can be above the melting point of the particular salt used, so that the salt is in molten state. Molten salt can facilitate the reaction between Mg and Ti(O) to form MgO. The salt can be a magnesium-containing salt, such as $MgCl_2$. The salt can also be a mixture including other salts. In some embodiments, the salt can include $MgCl_2$, KCl, NaCl, LiCl, RbCl, CsCl, $CaCl_2$, or combinations thereof (e.g. $MgCl_2$—KCl, $MgCl_2$—NaCl, $MgCl_2$—LiCl, $MgCl_2$—RbCl, $MgCl_2$—CsCl, $MgCl_2$—$CaCl_2$, $MgCl_2$—KCl—NaCl, $MgCl_2$—LiCl—NaCl, $MgCl_2$—RbCl—NaCl, $MgCl_2$—$CaCl_2$—NaCl, $MgCl_2$—$CaCl_2$—KCl, $MgCl_2$—$CaCl_2$—LiCl, et al). The composition of the mixed salt can include combinations of salts in a wide range of relative amounts, as long as the melting point of the eutectic salt is lower than 750° C., and the mass content of $MgCl_2$ in the mixed salt is no less than 2 wt %. One advantage of using a mixture of salts is that the melting temperature of a mixed salt or eutectic salt is often lower than that of a monolithic salt. For example, the melting temperature $MgCl_2$ is 714° C., while the liquid forming temperatures of $MgCl_2$—KCl with various compositions are listed in Table 1, which are determined by thermal gravimetric analysis and differential scanning calorimetry (TGA-DSC).

TABLE 1

Melting temperatures of the $MgCl_2$—KCl salts with different compositions

| | Molar ratio of $MgCl_2$ to KCl | | | | | | |
|---|---|---|---|---|---|---|---|
| | 1:0.25 | 1:0.51 | 1:1.01 | 1:1.51 | 1:1.99 | 1:3.23 | 1:4.04 |
| Melting temperature | 477° C. | 477° C. | 493° C. | 445° C. | 435° C. | 438° C. | 436° C. |

In one embodiment, the deoxygenation reaction can be conducted at a temperature higher than the melting point of the molten salt, but lower than the melting point of Mg. In other words, Mg can be in its solid state. In a particular example, the deoxygenation temperature can be from 590° C. to 900° C. In another particular example, the deoxygenation temperature can be from 650° to 750° C. In some cases the deoxygenation temperature can be from 550° C. to 900° C., while in other cases the deoxygenation temperature can be from 550° C. to 649° C. The deoxygenation temperature range can depend on melting points of Mg and corresponding salt. For example, if solid Mg and melted salt is used, a deoxygenation temperature from 550° to 649° C. can be used. While liquid Mg and $MgCl_2$-bearing eutectic salt, the deoxygenation temperature can range from 650° to 900° C. Similarly, with liquid Mg and mono $MgCl_2$ salt, the deoxygenation temperature can generally range from 715° to 900° C.

Methods according to the present invention can further comprise a step of leaching after the deoxygenation reaction to remove the byproduct of MgO, the remaining Mg, and the salt. Leaching can be carried out by using a dilute solution of HCl. Other acidic solutions can also be used. Other acids include, but are not limited to acetic acid, $NH_4Cl$, and so forth.

Table 2 compares the deoxygenation efficiencies of commercially pure Ti (CP—Ti) by Mg in pure $H_2$ and Ar atmosphere. The oxygen level in CP—Ti can be as low as 500-600 ppm after being treated by Mg in $H_2$, which is much lower than the ASTM standard specification of 0.15 wt % for Ti sponge. However, it was entirely another situation in Ar, and around 2 wt % of oxygen is in accordance with the experimental and predicted theoretical data. It is experimentally demonstrated that the thermodynamic equilibrium for Ti—Mg—O is modified by introducing hydrogen. The salt used in the deoxygenation process can kinetically enhance the deoxygenation rate, but does not change the thermodynamic limits involved.

TABLE 2

Deoxygenation efficiency comparison by Mg in $H_2$ and Ar atmosphere *

| Atmosphere and Temperature | $H_2$, 670° C. | Ar, 670° C. | $H_2$, 750° C. | Ar, 750° C. |
|---|---|---|---|---|
| O content after deoxygenation, wt % | 0.0555 | 2.22 | 0.0503 | 2.00 |

*: initial O content in α-Ti was (4.19 ± 0.01) wt %; Mass ratio of powder:salt:Mg was 2:1:0.378; the deoxygenation time was set at 12 hours.

Figure 5:
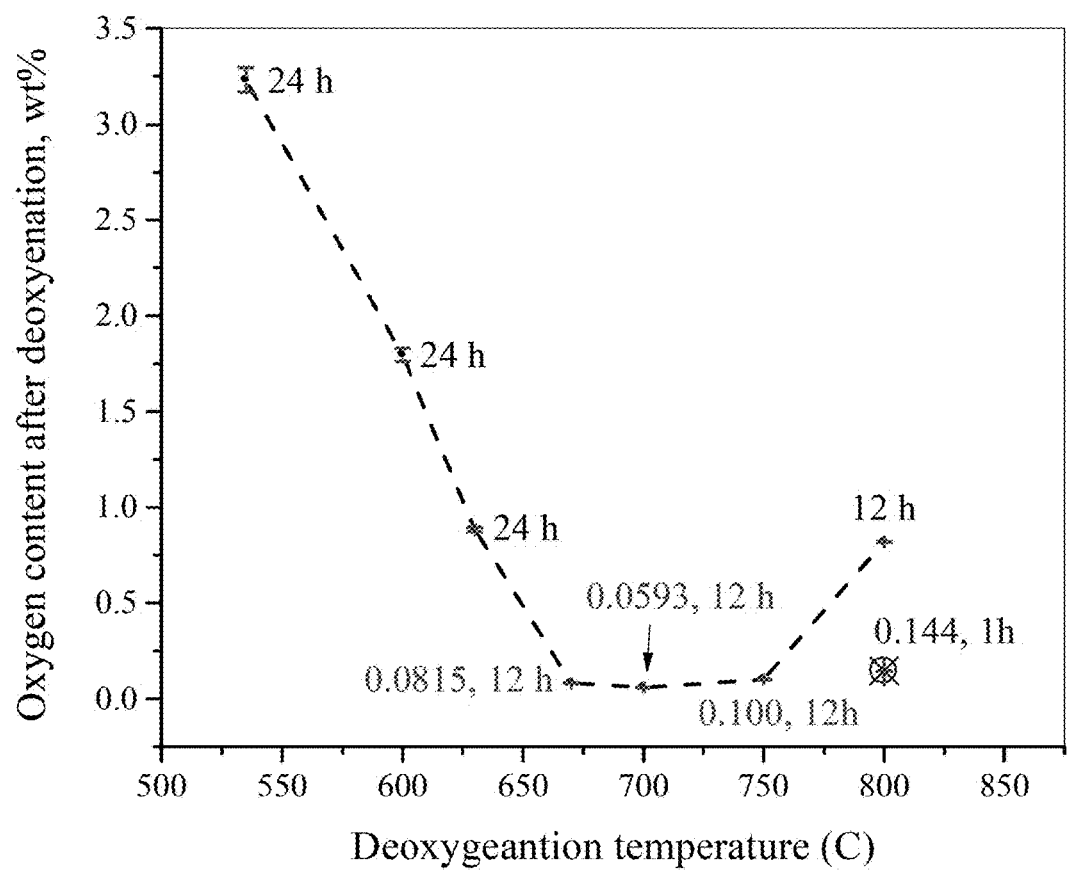
FIG. 5 is a graph of final oxygen content after deoxygenation vs. deoxygenation temperature.

FIGS. 5-8 show effects of certain variables on deoxygenation efficiency, including temperature, hydrogen partial pressure, time, and particle sizes. FIG. 5 shows a relationship between weight percent of oxygen after deoxygenation and deoxygenation temperature. The starting material here was the same as that in Table 2, and the eutectic salt composed of $MgCl_2$ and KCl was used. The study on the effects of temperature, time and particle size was performed in pure H$_2$ atmosphere. The deoxygenation times are shown in text next to each data point. The four lowest weight percentages are written out in text next to the corresponding data points. When reduced at a relatively low temperature of lower than the melting point of Mg metal (649° C.), a longer duration of 24 hours was applied. Otherwise, a shorter time of 12 hours was selected. It is demonstrated that satisfactory deoxygenation efficiency can be guaranteed when the temperature is set between 670 and 750° C. But, when further increasing temperature to 800° C., a shorter time of 1 hour even performs much better than 12 hours, which may be due to the limited evaporation loss of Mg reductant in a shorter time.

Figure 6:
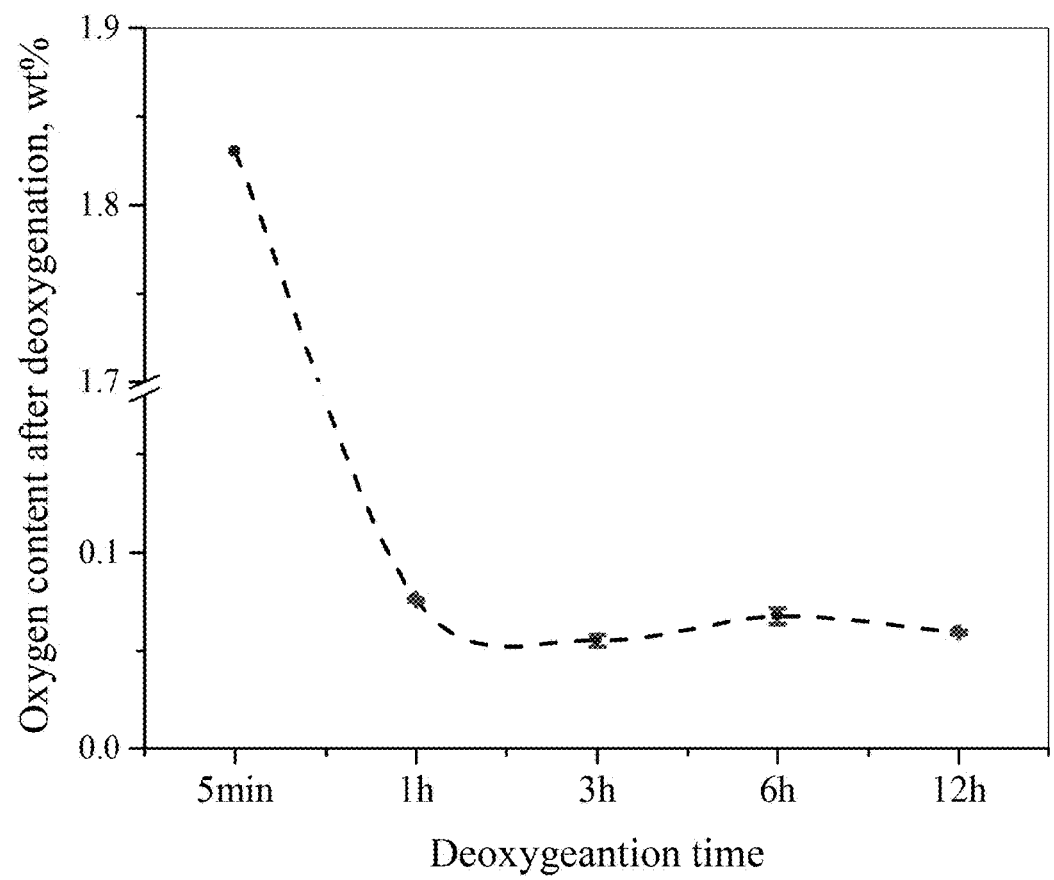
FIG. 6 is a graph of oxygen content after deoxygenation vs. deoxygenation time.

Thermodynamically, the oxygen content in titanium is a function of the reaction temperature. The lower the reaction temperature, the lower the oxygen content in titanium. However, using lower temperatures will inevitably lead to kinetic hurdles. Accordingly, the deoxygenation methods described herein can be performed over a range of temperatures which can not only provide favorable thermodynamics for deoxygenation, but also a suitable kinetic rate of deoxygenation. With the assistance of hydrogen and a MgCl$_2$-bearing salt, the deoxygenation rate can be quite fast. In some examples, the deoxygenation reaction can reach near equilibrium within 3 hours. In further embodiments, the period of time for the deoxygenation can be from about 0.5 hour to about 120 hours. FIG. 6 shows a relationship between oxygen content after deoxygenation and deoxygenation time. The starting material, same as that in Table 2 was deoxygenated at 680° C. using Mg with the assistance of MgCl$_2$—KCl eutectic salt in pure hydrogen atmosphere.

Figure 7:
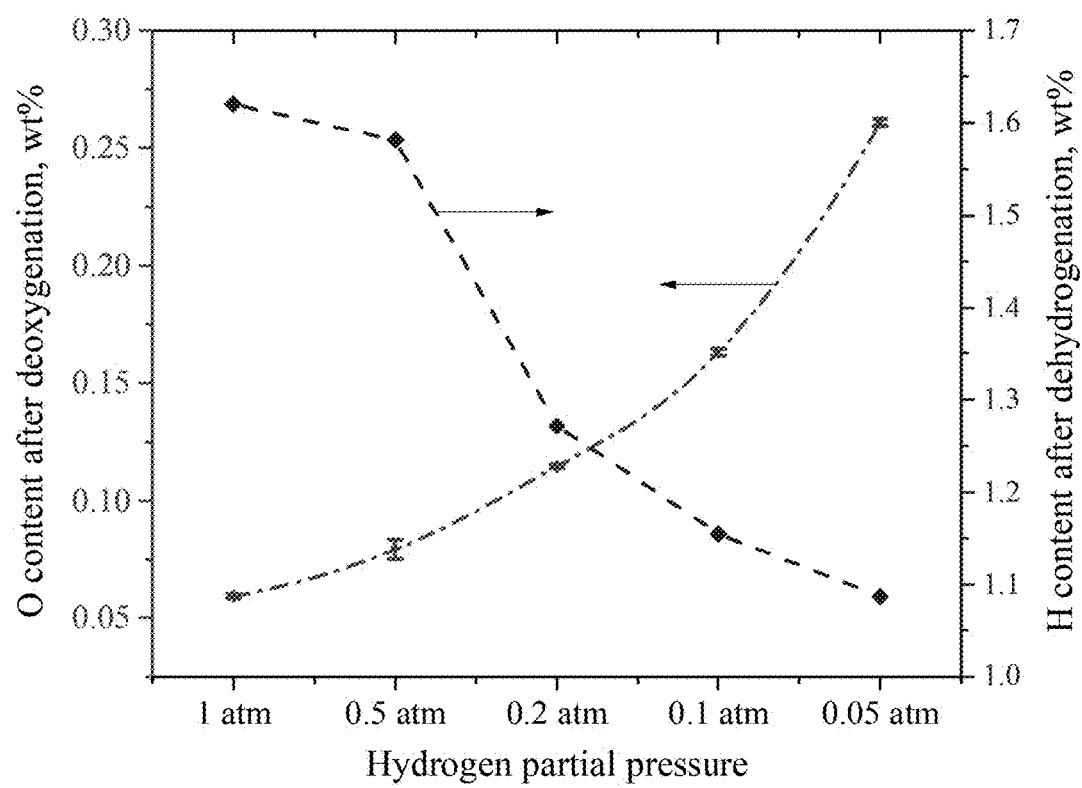
FIG. 7 is a graph of oxygen and hydrogen content after deoxygenation vs. hydrogen partial pressure.
Figure 8:
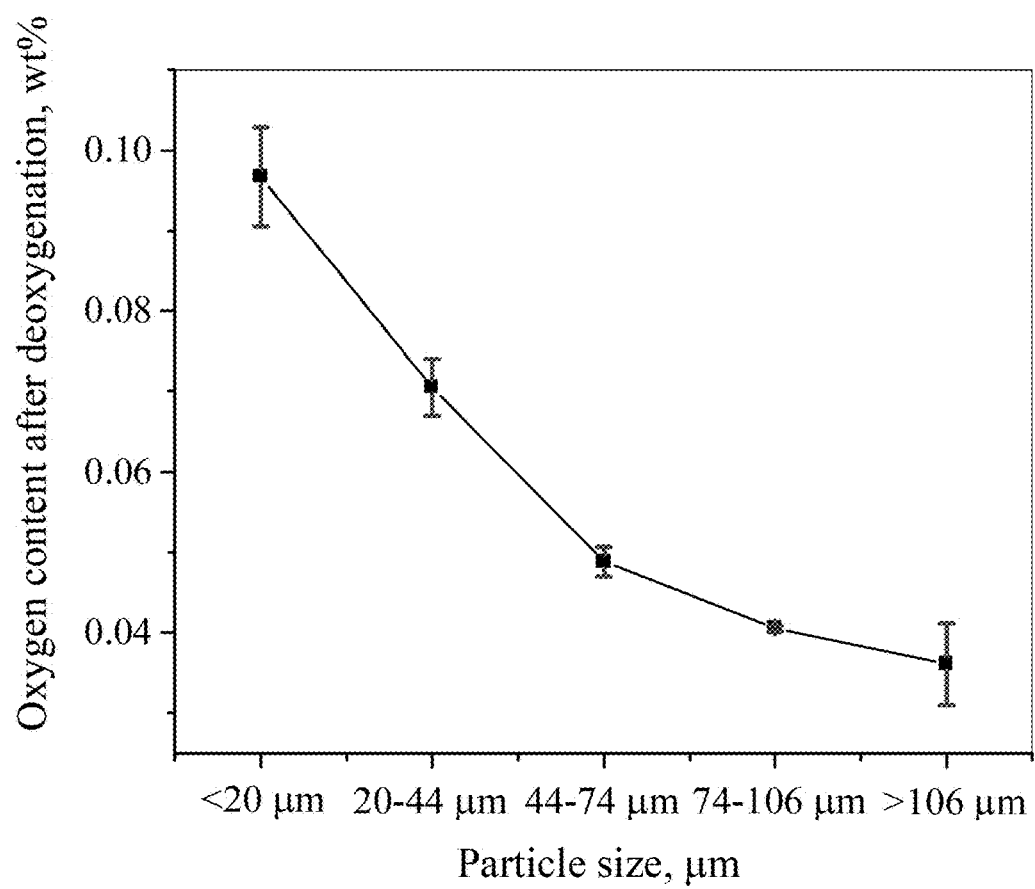
FIG. 8 is a graph of oxygen content after deoxygenation vs. particle size of the titanium particles.

According to FIG. 3, the formation of β-phase Ti(O) does not have to be in pure H$_2$ atmosphere. However, that the existence of a lowest limit of hydrogen partial pressure should be noticed. For instance, if the oxygen content in α-Ti is 2 wt % (point B in FIG. 3), theoretically, Mg will not exhibit deoxygenation capability at 700° C. with $a_H$ value smaller than 3.5 (point C, and hydrogen partial pressure 1.6% by volume), as β-phase Ti(O) cannot be formed. Thus, the effect of hydrogen partial pressure was investigated ranging from 5% to 100%. FIG. 7 shows relationships between hydrogen partial pressure and oxygen content after deoxygenation and hydrogen content after deoxygenation. Increasing hydrogen partial pressure results in lower oxygen contents and higher hydrogen contents after deoxygenation. The results show that the oxygen content can be greatly lowered to 0.26 wt % even under the hydrogen partial pressure as low as 5%. And the higher the hydrogen partial pressure, the higher the oxygen removal rate. The effect of particle size is shown in FIG. 8. As particle size decreases, the oxygen content after deoxygenation increases.

In certain embodiments, the final deoxygenated powder can have a dissolved oxygen content of less than 0.2% by weight. In further embodiments, the deoxygenated powder can have a dissolved oxygen content of less than 0.15% by weight.

Additionally, in some embodiments, the final deoxygenated metal can be in the form of a powder. In certain examples, the metal powder can include substantially spherical particles. Such powders can be useful in production of metal (e.g. Ti) parts. The deoxygenated metal powder can also serve as a 3D printing material with high uniformity and low oxygen content.

Figure 9:
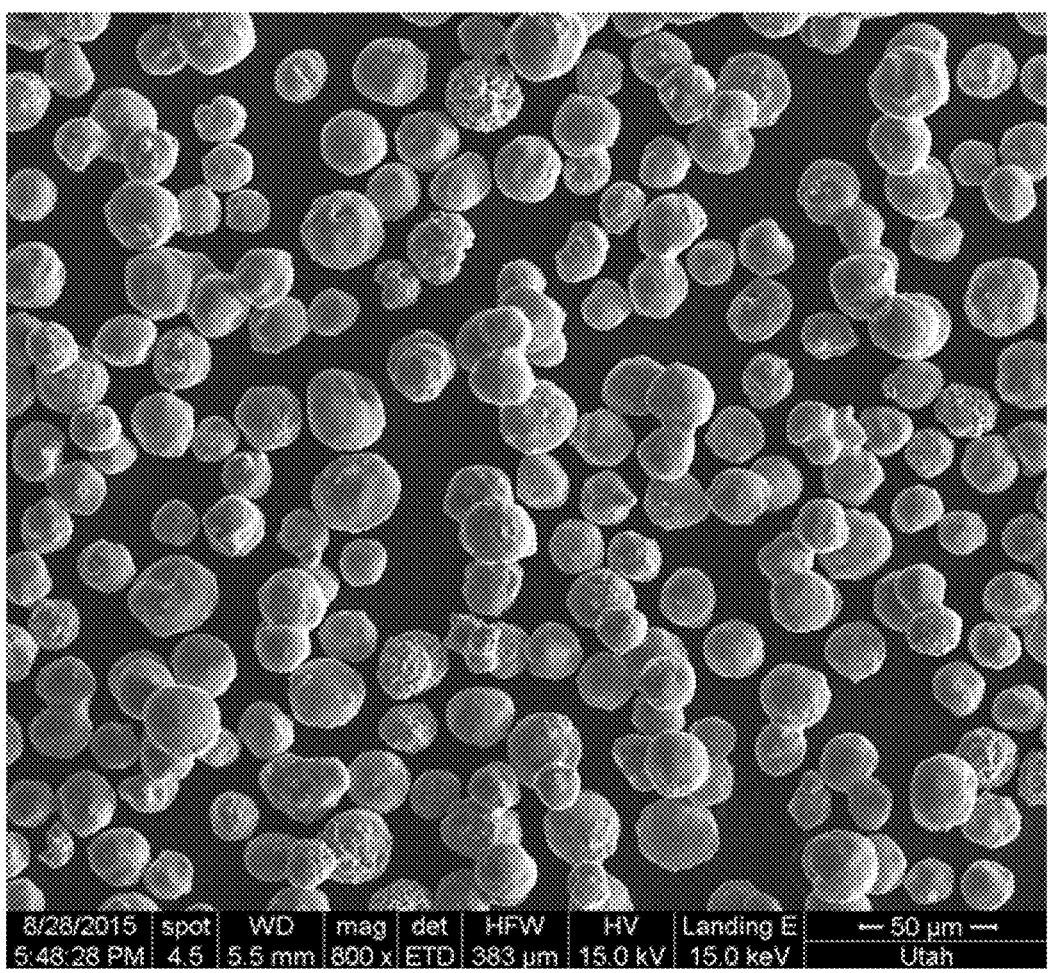
FIG. 9 is an SEM image of Ti powder before deoxygenation.
Figure 10:
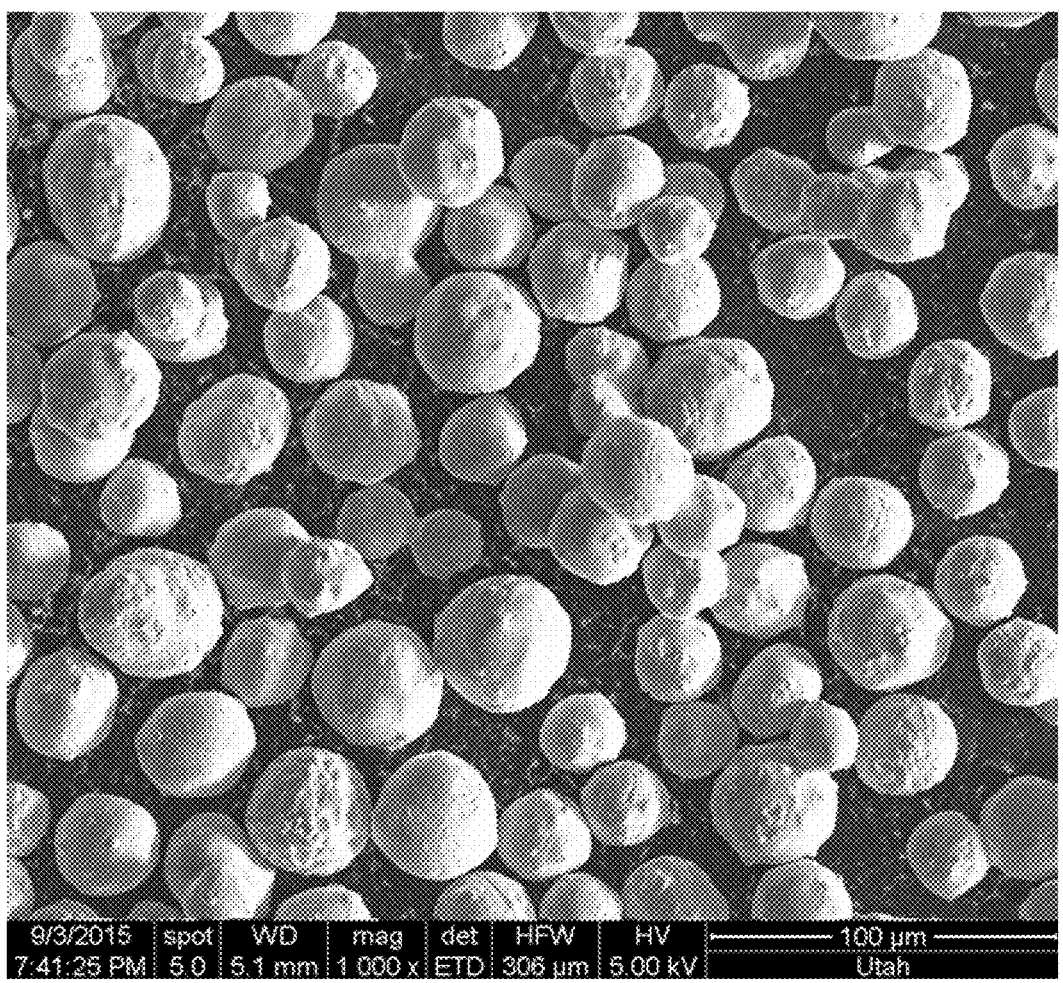
FIG. 10 is an SEM image of Ti powder after deoxygenation.
Figure 11:
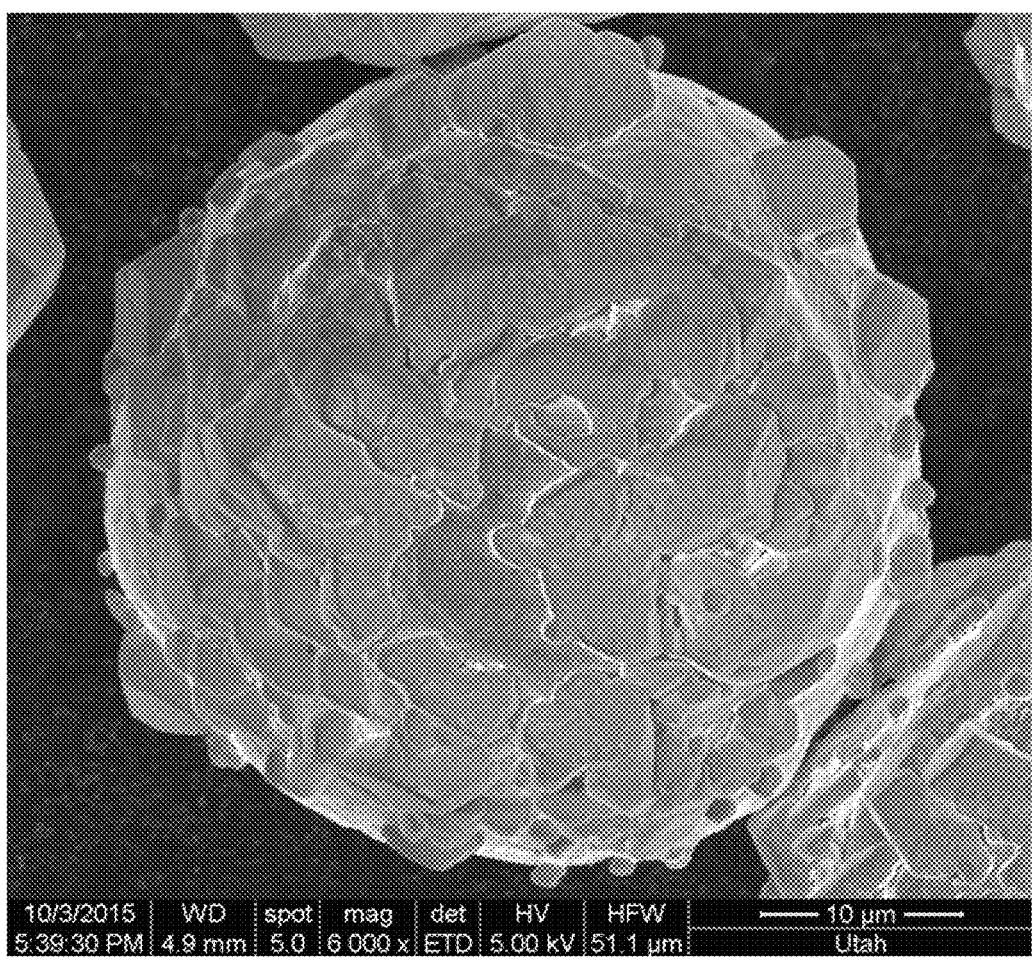
FIG. 11 is an SEM image of a deoxygenated and water-washed Ti particle with a MgO shell formed during the deoxygenation.
Figure 12:
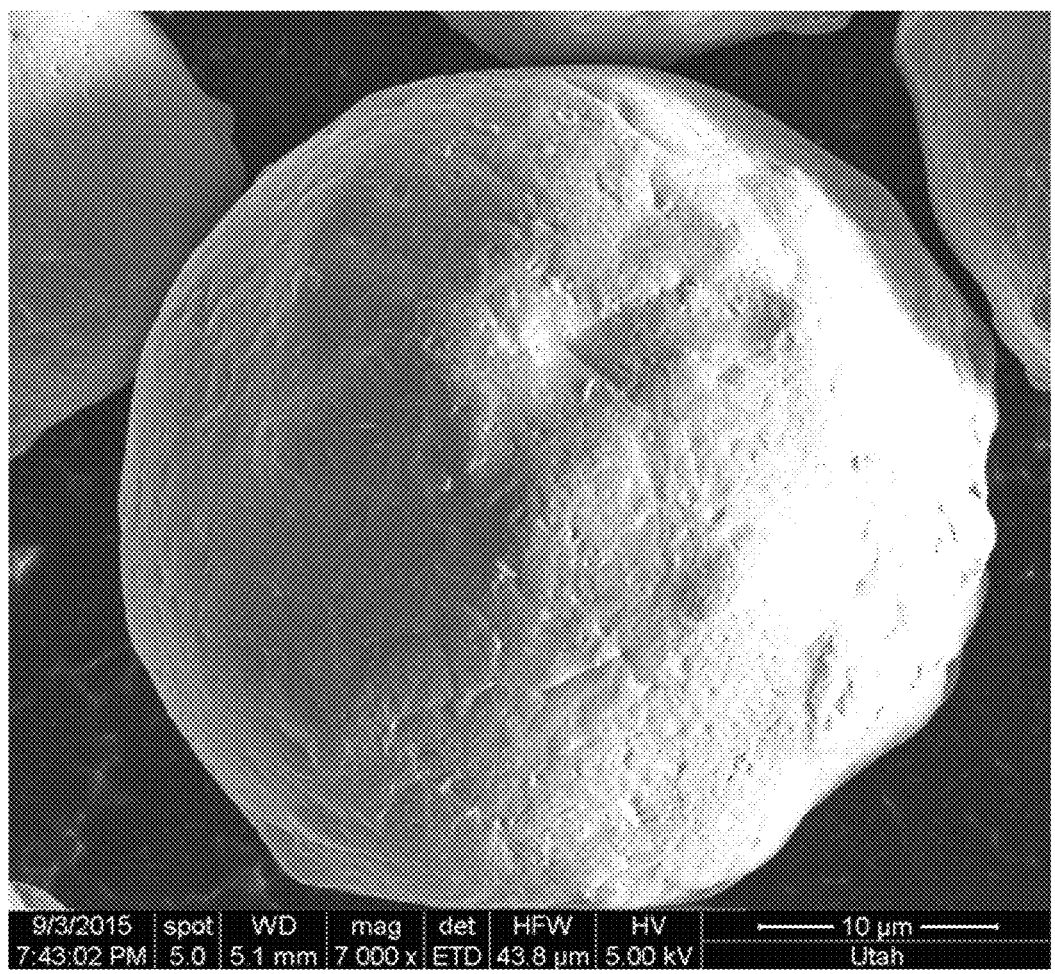
FIG. 12 is an SEM image of a final particle having a smooth surface.

FIG. 9 shows the morphology of a certain Ti powder before deoxygenation. FIG. 10 shows the morphology of Ti powder after deoxygenation. As seen in these figures, the morphology of the particles does not change appreciably due to deoxygenation. FIG. 11 shows a deoxygenated and water-washed Ti particle with a MgO shell formed during the deoxygenation. The MgO shell can help prevent sintering between the Ti particles during deoxygenation. Once deoxygenation is complete, the MgO shell can be removed by leaching. The leaching step can also remove any Mg-containing salt and metallic Mg used during the deoxygenation. FIG. 12 shows a final Ti particle having a smooth surface. The hydrogen content in this final powder was determined to be 1.62 wt %.

In another optional aspect, a separator can be added to the mixture during processing. Such a separator can help to avoid agglomeration of metal powder during deoxygenation. Suitable particulate separators can include, but are not limited to, MgO, CaO, BaO, et al., and combinations thereof. Separator material can generally comprise from 0 to 1000 percent by weight of the metal powder, and in some cases from 0.1 to 1000 wt %. Adding separator is quite useful when the oxygen content in the initial metal powder is lower than 0.5 wt %, because the amount of deoxygenation byproduct MgO may not be sufficient to inhibit the sintering between particles.

Alternatively, separators can be avoided by controlled oxidation of a metal powder prior to deoxygenation. Controlled oxidation can be accomplished either by exposing the particulate metal to an oxygen source (e.g. pure oxygen gas, Ar—O$_2$ mixed gas with oxygen volume ratio ranging from 0.1% to 100%, or the like), or by sintering the mixture of metal powder and oxide powder (e.g. MgO powder, CaO powder, TiO$_2$ powder, or the like) in Ar or H$_2$ or Ar—H$_2$ mixed atmosphere. Controlled oxidation by the former method can generally be maintained at room temperature up to about 700° C., while temperature from 300-1400° C. for the latter method to transfer oxygen from corresponding oxygen sources (e.g. MgO, CaO, etc) to the metal powder. Typically, such metal powder prior to controlled oxidation can have oxygen content from 0.2 wt % to 0.5 wt %. The controlled oxidation can result in an oxygen content from 0.5 wt % to 10 wt %. Subsequently, the metal powder can be subjected to deoxygenation as previously described. The increased oxygen content in metal powder will lead to an increased amount of byproduct MgO after deoxygenation, which acts as a separator between metal particles.

Figure 13:
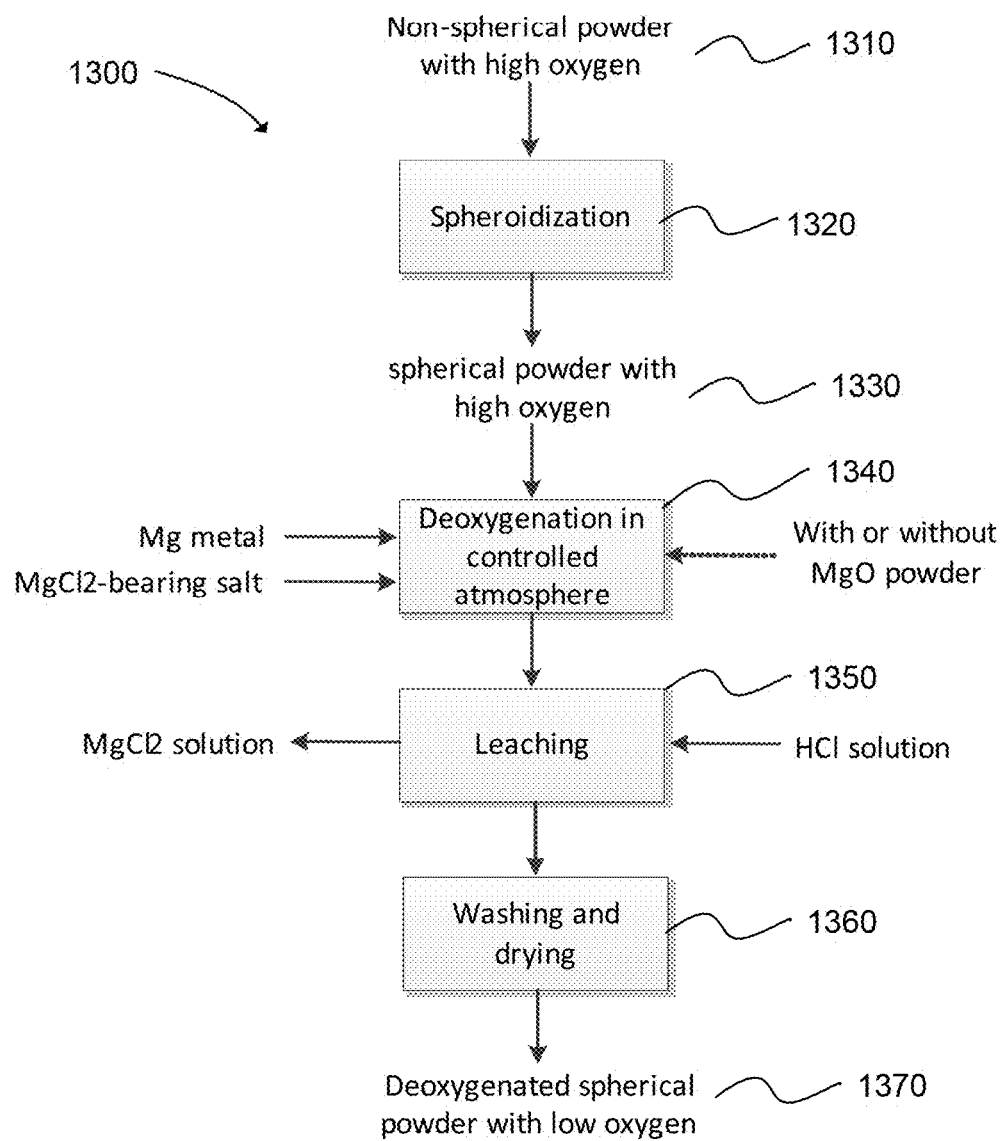
FIG. 13 is a flow chart illustrating a method of deoxygenating metal where spheroidization occurs prior to deoxygenation in accordance with one example of the present invention.

FIG. 13 illustrates a method 1300 of deoxygenating metals which includes spheroidization prior to deoxygenation in accordance with one implementation of the disclosed process. More specifically, a non-spherical metal powder having a high oxygen content can be supplied 1310. The non-spherical metal powder can then be subjected to spheroidization 1320 to form spherical metal powder having a relatively high oxygen content 1330. The spherical metal powder can then be subjected to deoxygenation in a controlled hydrogen atmosphere 1340 as previously described. This step can be performed with MgO as an optional separator material. The resulting deoxygenated metals are mixed with by-products of deoxygenation such as MgO, unreacted Mg, and various salts. Such by-products can be removed by leaching 1350 as previously described. The leached materials can then be subjected to washing and drying 1360 to produce a deoxygenated spherical powder having low oxygen 1370 consistent with the processes described herein.

Figure 14:
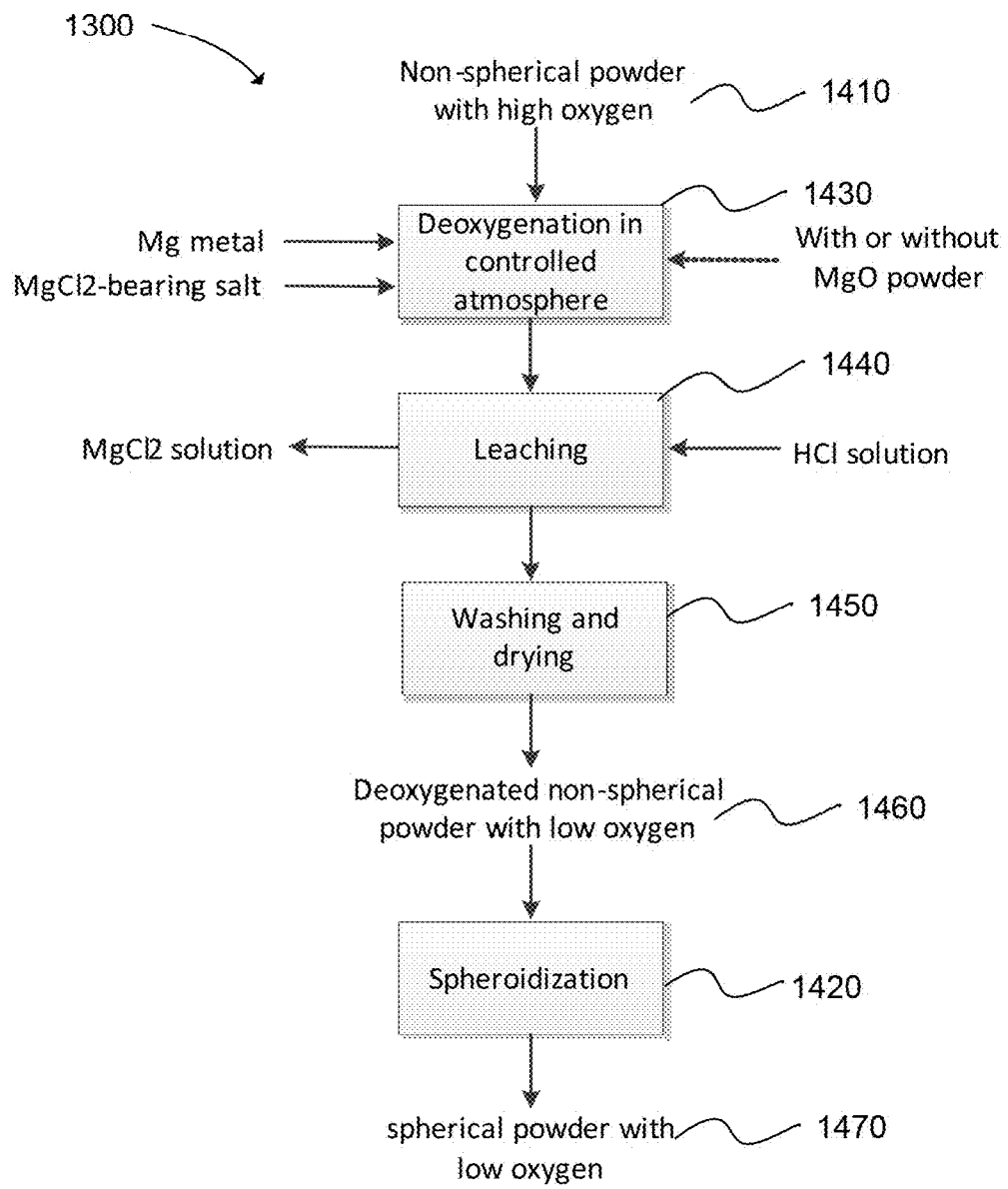
FIG. 14 is a flow chart illustrating a method of deoxygenating metal where spheroidization occurs after deoxygenation in accordance with one example of the present invention.

FIG. 14 illustrates a method 1400 similar to FIG. 13 except the spheroidization step occurs subsequent to deoxygenation 1430, leaching 1440, and washing and drying 1450.

Figure 15:
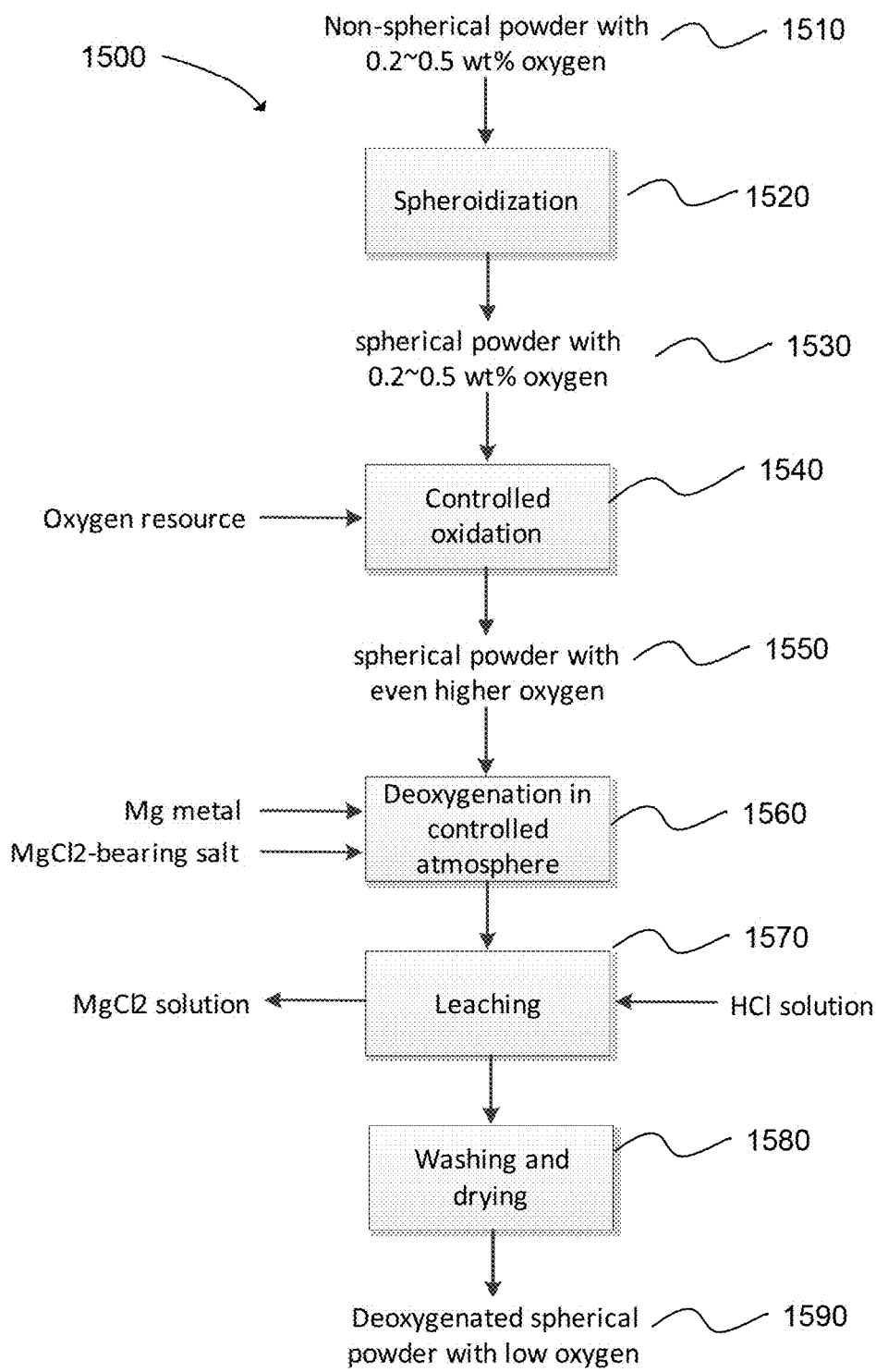
FIG. 15 is a flow chart illustrating a method of deoxygenating metal where spheroidization and an oxidation step occurs prior to deoxygenation in accordance with one example of the present invention.

FIG. 15 illustrates a method 1500 of deoxygenating metals which includes spheroidization and a controlled oxidation prior to deoxygenation in accordance with one implementation of the disclosed process. More specifically, a non-spherical metal powder having a relatively low oxygen content can be supplied 1510. The non-spherical metal powder can then be subjected to spheroidization 1520 to form spherical metal powder 1530. The spherical metal powder can then be subjected to a controlled oxidation 1540 using an oxygen source to increase oxygen content of the metal powder and form a spherical powder having relatively higher oxygen content 1550. The spherical powder can then be subjected to deoxygenation in a controlled hydrogen atmosphere 1560 as previously described. With pre-oxidation the use of a separator during deoxygenation can generally be avoided. The resulting deoxygenated metals are mixed with by-products of deoxygenation such as MgO, unreacted Mg, and various salts. Such by-products can be removed by leaching 1570 as previously described. The leached materials can then be subjected to washing and drying 1580 to produce a deoxygenated spherical powder having low oxygen 1590 consistent with the processes described herein.

Figure 16:
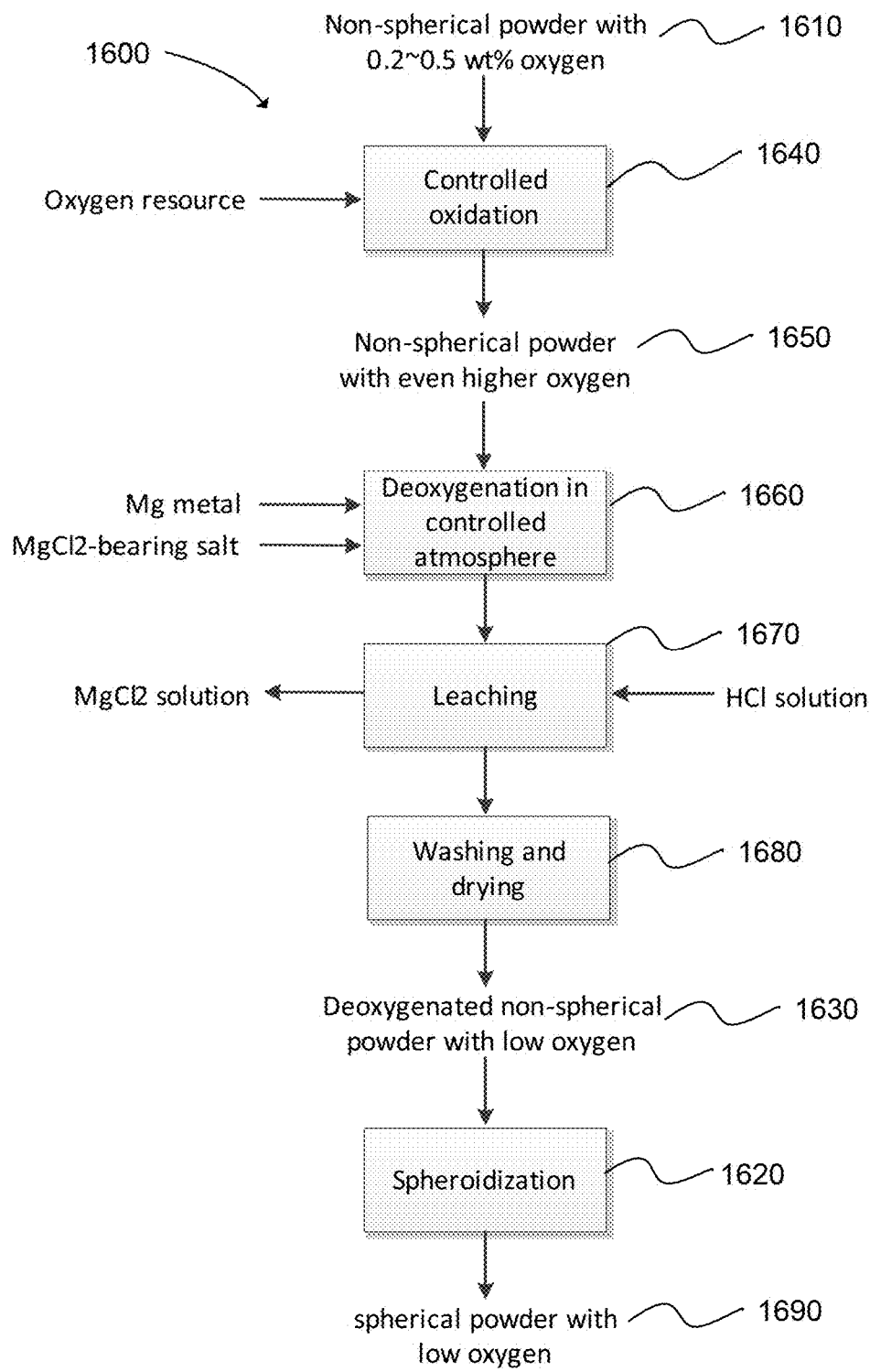
FIG. 16 is a flow chart illustrating a method of deoxygenating metal where an oxidation step occurs prior to deoxygenation followed by spheroidization in accordance with one example of the present invention.

FIG. 16 illustrates a method 1600 similar to that illustrated in FIG. 15 except spheroidization 1620 of a non-spherical powder 1630 occurs after deoxygenation 1660, leaching 1670, and washing and drying 1680.

EXAMPLES

Example 1. Deoxygenation of Non-Spherical Ti Powder

An amount of 5 grams of non-spherical Ti powder containing 1% oxygen is mixed with 0.23 grams of Mg, and 2.5 grams of anhydrous $MgCl_2$. The mixture is placed in a stainless steel crucible. The crucible is lined with a molybdenum (Mo) sheet to prevent possible reactions between the Ti and the stainless steel of the crucible. The crucible loaded with the mixture is placed into a tube furnace. The furnace is purged with regular Ar for half an hour prior to heating. Then the furnace is heated up to 730° C. with a heating rate 10° C./min and held for 8 h in a flowing $H_2$ atmosphere. After the deoxygenation, the furnace is cooled down to room temperature in $H_2$ atmosphere and purged with Ar before unloading the sample. The solid is leached with dilute acetic acid at room temperature for 1 h. The solid is then washed with water several times until the pH value reaches 7. The powder is further rinsed by ethanol and acetone, and finally dried in air or vacuum. The oxygen content in the non-spherical Ti powder is decreased to 0.13 wt %.

Example 2. Deoxygenation of Spherical Ti-6Al-4V Powder

An amount of 5 grams of spherical Ti-6Al-4V powder containing 4% oxygen is mixed with 0.9 grams of Mg, and 2.5 grams of anhydrous $MgCl_2$—KCl eutectic salt (molar ratio of $MgCl_2$ to KCl is 1:0.25). The mixture is placed in a stainless steel crucible. The crucible is lined with a Mo sheet to prevent possible reactions between Ti and stainless steel. The crucible loaded with the mixture is placed into a tube furnace. The furnace is purged with regular Ar for half an hour prior to heating. Then the furnace is heated up to 630° C. with a heating rate 10° C./min and held for 12 h in a flowing $H_2$ atmosphere. After the deoxygenation, the furnace is cooled down to room temperature in $H_2$ atmosphere and purged with Ar before unloading the sample. The solid is leached with dilute acetic acid at room temperature for 1 h. The solid is then washed with water several times until the pH value reaches 7. The powder is rinsed with ethanol and acetone, and finally dried in air or vacuum. The oxygen content in the spherical Ti-6Al-4V powder is decreased to 0.06 wt %.

Example 3. Deoxygenation of Non-Spherical Ti Powder 5 grams of non-spherical Ti powder containing 2% oxygen is mixed with 0.30 grams of Mg, and 2.5 grams of anhydrous $MgCl_2$—KCl eutectic salt (molar ratio of $MgCl_2$ to KCl is 1:0.25). The mixture is placed in a stainless steel crucible. The crucible is lined with a Mo sheet to prevent possible reactions between Ti and stainless steel. The crucible loaded with the mixture is placed into a tube furnace. The furnace is purged with regular Ar for half an hour prior to heating. Then the furnace is heated up to 670° C. with a heating rate 10° C./min and held for 9 h in a flowing $H_2$ atmosphere. After the deoxygenation, the furnace is cooled down to room temperature in $H_2$ atmosphere and purged with Ar before unloading the sample. The solid is leached with dilute HCl solution at room temperature for 1 h. A pH value of no lower than 1.5 is utilized during the leaching to prevent Ti dissolving. The solid is then washed with water several times until the pH value reaches 7. The solid is then rinsed by ethanol and acetone, and finally dried in air or vacuum. The oxygen content in the non-spherical Ti powder is decreased to 0.09 wt %.

Example 4. Deoxygenation of Spherical Ti-6Al-4V Powder 5 grams of spherical Ti-6Al-4V powder containing 4% oxygen is mixed with 0.9 grams of Mg, and 3.75 grams of anhydrous $MgCl_2$—KCl eutectic salt (molar ratio of $MgCl_2$ to KCl is 1:0.25). The mixture is placed in a stainless steel crucible. The crucible is lined with a Mo sheet to prevent possible reactions between Ti and stainless steel. The crucible loaded with the mixture is placed into a tube furnace. The furnace is purged with regular Ar for half an hour prior to heating. Then the furnace is heated up to 670° C. with a heating rate 10° C./min and held for 24 h in a flowing 50% $H_2$+50% Ar atmosphere. After the deoxygenation, the furnace is cooled down to room temperature in 50% $H_2$+50% Ar atmosphere and purged with pure Ar before unloading the sample. The solid is leached with dilute acetic acid at room temperature for 0.5 h. The solid is then washed with water several times until the pH value reaches 7. The solid is further rinsed by ethanol and acetone, and finally dried in air or vacuum. The oxygen content in the spherical Ti-6Al-4V powder is decreased to 0.07 wt %.

Example 5. Deoxygenation of Non-Spherical Ti Powder 5 grams of non-spherical Ti powder containing 2% oxygen is mixed with 0.45 grams of Mg, and 5 grams of anhydrous $MgCl_2$ salt. The mixture is placed in a stainless steel crucible. The crucible is lined with a Mo sheet to prevent possible reactions between Ti and stainless steel. The crucible loaded with the mixture is placed into a tube furnace. The furnace is purged with regular Ar for half an hour prior to heating. Then the furnace is heated up to 750° C. with a heating rate 10° C./min and held for 6 h in a flowing H₂ atmosphere. After the deoxygenation, the furnace is cooled down to room temperature in H₂ atmosphere and purged with Ar before unloading the sample. The solid is leached with dilute HCl solution at room temperature for 1 h. A pH value of no lower than 1.5 is utilized during the leaching to prevent Ti dissolving. The solid is then washed with water several times until the pH value reaches 7. The solid is further rinsed by ethanol and acetone, and finally dried in air or vacuum. The oxygen content in the non-spherical Ti powder is decreased to 0.14 wt %.

Example 6. Deoxygenation of Spherical Ti-6Al-4V Powder 5 grams of spherical Ti-6Al-4V powder containing 5% oxygen is mixed with 1.13 grams of Mg, and 2.5 grams of anhydrous $MgCl_2$—KCl eutectic salt (molar ratio of $MgCl_2$ to KCl is 1:0.5). The mixture is placed in a stainless steel crucible. The crucible is lined with a Mo sheet to prevent possible reactions between Ti and stainless steel. The crucible loaded with the mixture is placed into a tube furnace. The furnace is purged with regular Ar for half an hour prior to heating. Then the furnace is heated up to 600° C. with a heating rate 10° C./min and held for 18 h in a H₂ atmosphere. After the deoxygenation, the furnace is cooled down to room temperature in H₂ atmosphere and purged with pure Ar before unloading the sample. The solid is leached with dilute acetic acid at room temperature for 1 h. The solid is then washed with water several times until the pH value reaches 7. The solid is further rinsed by ethanol and acetone, and finally dried in air or vacuum. The oxygen content in the spherical Ti-6Al-4V powder is decreased to 0.05 wt %.

Example 7. Deoxygenation of Non-Spherical Ti Powder 5 grams of non-spherical Ti powder containing 2% oxygen is mixed with 0.45 grams of Mg, and 2.5 grams of anhydrous $MgCl_2$—KCl eutectic salt (molar ratio of $MgCl_2$ to KCl is 1:0.5). The mixture is placed in a stainless steel crucible. The crucible is lined with a Mo sheet to prevent possible reactions between Ti and stainless steel. The crucible loaded with the mixture is placed into a tube furnace. The furnace is purged with regular Ar for half an hour prior to heating. Then the furnace is heated up to 700° C. with a heating rate 10° C./min and held for 24 h in a flowing 10% H₂+90% Ar atmosphere. After the deoxygenation, the furnace is cooled down to room temperature in 10% H₂+90% Ar atmosphere and purged with Ar before unloading the sample. The solid is leached with dilute HCl solution at room temperature for 1 h. A pH value of no lower than 1.5 is utilized during the leaching to prevent Ti dissolving. The solid is then washed with water several times until the pH value reaches 7. The solid is further rinsed by ethanol and acetone, and finally dried in air or vacuum. The oxygen content in the non-spherical Ti powder is decreased to 0.18 wt %.

The described features, structures, or characteristics may be combined in any suitable manner in one or more examples. In the preceding description numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A method of deoxygenating metal, comprising:
    forming a mixture comprising:
        (a) a metal having oxygen dissolved therein in a solid solution, wherein the metal includes less than 50% by weight of metal oxides,
        (b) at least one of metallic magnesium and $MgH_2$, and
        (c) a magnesium-containing salt;
    heating the mixture at a deoxygenation temperature for a period of time under a hydrogen-containing atmosphere to form a deoxygenated metal; and
    cooling the deoxygenated metal.

2. The method of claim 1, wherein the metal comprises titanium and has a dissolved oxygen content from about 0.15 wt % to about 14.3 wt %.

3. The method of claim 1, wherein the metal includes less than 10% by weight of metal oxides.

4. The method of claim 1, wherein the metal is titanium having less than 10% by weight of metal oxides, and the method further comprises reducing a purified $TiO_2$ to form a hydrogenated titanium product and dehydrogenating the hydrogenated titanium product to form the metal.

5. The method of claim 1, wherein the metal is particulate metal powder.

6. The method of claim 1, wherein the metal is substantially spherical Ti or Ti alloy powder.

7. The method of claim 1, wherein the mixture further comprises a particulate separator material.

8. The method of claim 7, wherein the particulate separator is MgO powder.

9. The method of claim 7, wherein the particulate separator is 0.1 to 1000 wt % by weight of the particulate metal.

10. The method of claim 1, further comprising pre-oxidizing the metal to an oxygen level of 0.5 wt % to 10 wt % prior to heating the mixture at the deoxygenation temperature, wherein an initial oxygen content of the metal is from 0.2 wt % to 0.5 wt % such that excess MgO is formed as a separator during heating the mixture at the deoxygenation temperature.

11. The method of claim 1, further comprising spheroidizing either the metal or the deoxygenated metal.

12. The method of claim 11, wherein the spheroidizing is accomplished by passing an irregularly shaped Ti or Ti alloy powder through an induction plasma torch.

13. The method of claim 1, wherein the hydrogen-containing atmosphere is substantially pure hydrogen or is a mixture of hydrogen and argon.

14. The method of claim 1, wherein the magnesium-containing salt is substantially pure $MgCl_2$.

15. The method of claim 1, wherein the magnesium-containing salt comprises $MgCl_2$, $MgBr_2$, KCl, NaCl, LiCl, RbCl, CsCl, $CaCl_2$, or combinations thereof.

16. The method of claim 1, wherein the deoxygenation temperature is above a melting point of the magnesium-containing salt.

17. The method of claim 1, wherein the deoxygenation temperature is below a melting point of the metallic magnesium.

18. The method of claim 1, wherein the deoxygenation temperature is from 550° C. to 900° C.

19. The method of claim 1, further comprising leaching the deoxygenated metal to remove unreacted magnesium, magnesium byproducts, and optionally salts.

20. The method of claim 1, wherein the deoxygenated metal has a dissolved oxygen content of less than 0.2% by weight.

21. The method of claim 1, wherein the deoxygenated metal is a metal powder.

22. The method of claim 21, wherein the metal powder comprises substantially spherical particles.

23. The method of claim 1, wherein the deoxygenated metal comprises titanium, aluminum, chromium, vanadium, niobium, tantalum, zirconium, tungsten, molybdenum, hafnium, or alloys thereof.

24. A method of deoxygenating metal, comprising:
forming a mixture comprising:
(a) a metal having oxygen dissolved therein in a solid solution,
(b) at least one of metallic magnesium and $MgH_2$, and
(c) a magnesium-containing salt;
heating the mixture at a deoxygenation temperature for a period of time under a hydrogen-containing atmosphere to form a deoxygenated metal, wherein the deoxygenation temperature is below a melting point of the metallic magnesium; and
cooling the deoxygenated metal.

25. A method of deoxygenating metal, comprising:
forming a mixture comprising:
(a) a particulate metal having oxygen dissolved therein in a solid solution,
(b) at least one of metallic magnesium and $MgH_2$, and
(c) a magnesium-containing salt;
pre-oxidizing the particulate metal to an oxygen level of 0.5 wt % to 10 wt %, wherein an initial oxygen content of the particulate metal is from 0.2 wt % to 0.5 wt % such that excess MgO is formed as a separator during heating the mixture at a deoxygenation temperature;
heating the mixture at the deoxygenation temperature for a period of time under a hydrogen-containing atmosphere to form a deoxygenated metal; and
cooling the deoxygenated metal.

* * * * *